US008130282B2

(12) United States Patent  
Miura et al.

(10) Patent No.: US 8,130,282 B2
(45) Date of Patent: Mar. 6, 2012

(54) IMAGE CAPTURE DEVICE

(75) Inventors: Yuki Miura, Osaka (JP); Eiji Anno, Nara (JP)

(73) Assignee: Panasonic Corporation, Osaka (JP)

( * ) Notice: Subject to any disclaimer, the term of this patent is extended or adjusted under 35 U.S.C. 154(b) by 403 days.

(21) Appl. No.: 12/413,643

(22) Filed: Mar. 30, 2009

(65) Prior Publication Data
US 2009/0244315 A1 Oct. 1, 2009

(30) Foreign Application Priority Data

Mar. 31, 2008 (JP) ................................ 2008-091093

(51) Int. Cl.
H04N 5/228 (2006.01)
H04N 5/225 (2006.01)
H04N 5/262 (2006.01)
G06K 9/46 (2006.01)
G06K 9/00 (2006.01)
G06K 9/34 (2006.01)
G06K 9/20 (2006.01)

(52) U.S. Cl. ................. 348/222.1; 348/208.14; 348/169; 348/239; 382/190; 382/118; 382/195; 382/164; 382/282

(58) Field of Classification Search .................. 348/239, 348/169, 170–172, 208.14, 240.1, 240.3, 348/240.99; 382/190, 191, 192, 195, 118, 382/116, 282, 162, 164, 117, 201, 206, 243
See application file for complete search history.

(56) References Cited

U.S. PATENT DOCUMENTS

2003/0071908 A1* 4/2003 Sannoh et al. ............... 348/345
2007/0013791 A1* 1/2007 Kinoshita et al. ............ 348/239
2008/0037827 A1* 2/2008 Corcoran et al. ............ 382/103

FOREIGN PATENT DOCUMENTS

JP 2007-042072 2/2007

* cited by examiner

Primary Examiner — Lin Ye
Assistant Examiner — Marly Camargo
(74) Attorney, Agent, or Firm — Renner, Otto, Boisselle & Sklar, LLP

(57) ABSTRACT

An image capture device according to the present invention includes: an image capturing section for capturing a subject's image and generating image data, thereby outputting a moving picture; a first area shifting section for shifting a first area, which is associated with a first kind of feature information that represents a first feature in the image data, based on a result of search for the first kind of feature information through the image data; and a second area shifting section for shifting, independently of the first area, a second area, which is associated with a second kind of feature information that represents a second feature in the image data, based on a result of search for the second kind of feature information through the image data. If unable to detect the second kind of feature information, the second area shifting section shifts the second area with respect to the location of the first area.

8 Claims, 28 Drawing Sheets

| (CURRENTLY MOST SIMILAR) DECISION AREA | COLOR INFORMATION | LOCATION INFORMATION (DESTINATION) |
|---|---|---|
| | COLOR INFORMATION ABOUT AREA X | LOCATION INFORMATION ABOUT AREA X | ns # IMAGE CAPTURE DEVICE

BACKGROUND OF THE INVENTION

1. Field of the Invention

The present invention relates to an image capture device that can track a feature in a moving picture. The present invention is applicable to digital cameras, camcorders, personal digital assistants with face detection function and tracking function that uses color information.

2. Description of the Related Art

As an exemplary image capture device with the face detection function, Japanese Patent Application Laid-Open Publication No. 2007-42072 proposes a device for continuing to track a target face, which the device has once lost sight of, in a moving picture by estimating the location of that face.

To get such tracking done, the image capture device of Japanese Patent Application Laid-Open Publication No. 2007-42072 stores in advance not just information about the face detected but also information about what surrounds the face (which will be referred to herein as "environment information"). The environment information is acquired from an area that has been defined based on its location with respect to the face. In the current frame of the moving picture, the current location of the face is roughly estimated based on its past location. In the vicinity of the estimated location, a location that is closest to the environment information stored is searched for. And based on such a location that has been determined to be closest and the relative locations of the environment information and the face, the location of the face in the current frame of the moving picture can be estimated.

The image capture device of Japanese Patent Application Laid-Open Publication No. 2007-42072 roughly estimates the current location of the face based on its past location and searches for a location that is closest to the environment information in the vicinity of the estimated location. That is to say, the search range of that location closest to the environment information is determined by how accurately the current rough location of the face can be estimated. This means that the accuracy of estimating the current exact location of the face depends on the accuracy of estimating the current rough location of the face. And if the accuracy of estimating the current rough location of the face were poor, then no location that is close enough to the environment information could be found or even a wrong location might be detected, too. In that case, the current exact location of the face could not be estimated or a wrong location might be detected.

It is therefore an object of the present invention to provide an image capture device that can track a feature highly accurately in a moving picture even in a situation where the feature being tracked cannot be searched for accurately enough.

SUMMARY OF THE INVENTION

An image capture device according to the present invention includes: an image capturing section for capturing a subject's image and generating image data, thereby outputting a moving picture; a first area shifting section for searching the image data for a first kind of feature information that represents a first feature and shifting a first area which is associated with the first kind of feature information based on a result of search for the first kind of feature information; and a second area shifting section for searching the image data for a second kind of feature information that represents a second feature and operable to shift, independently of the first area, a second area which is associated with the second kind of feature information based on a result of search for the second kind of feature information. The second area shifting section selects, based on the result of search for the second kind of feature information, at least one of the result of search for the second kind of feature information and a location of the first area on the image data and shifts the second area based on the result of the selecting.

In one preferred embodiment, in shifting the second area with respect to the location of the first area on the image data, the second area shifting section determines the destination of the second area in accordance with the relation between the locations of the first and second areas that has been defined statistically based on past image data.

In another preferred embodiment, the relation between the locations of the first and second areas has been defined statistically by determining the first and second areas to be associated with each other on multiple pictures of the past image data.

In a specific preferred embodiment, the first kind of feature information is a piece of information about the subject's face, and the second kind of feature information is a piece of information about the color of a portion of the subject's image.

In an alternative preferred embodiment, the first kind of feature information is a piece of information about the color of a portion of the subject's image, and the second kind of feature information is a piece of information about the subject's face.

According to the present invention, a plurality of areas that are associated with multiple sorts of features can be shifted independently of each other. Also, based on the location of a first area associated with a first kind of feature information and/or a result of the search for a second kind of feature information, a second area is shifted. Since the second area can be shifted with respect to the location of the first area being shifted independently, the second area can continue to be shifted with higher accuracy.

Furthermore, in a preferred embodiment of the present invention, the destination of the second area is determined by the relation between the locations of the first and second areas that has been defined in a situation where the first and second areas are determined to be associated with each other based on the multiple pictures of past image data. Since the first and second areas being shifted independently of each other are associated with each other based on multiple pieces of image data, their relation thus defined is so reliable that the location of the second area can be estimated much more accurately.

According to the present invention, even in a situation where a kind of feature information being tracked in a moving picture cannot be searched for accurately, an area that is associated with that feature information can continue to be shifted highly accurately.

Other features, elements, processes, steps, characteristics and advantages of the present invention will become more apparent from the following detailed description of preferred embodiments of the present invention with reference to the attached drawings.

Figure 5:
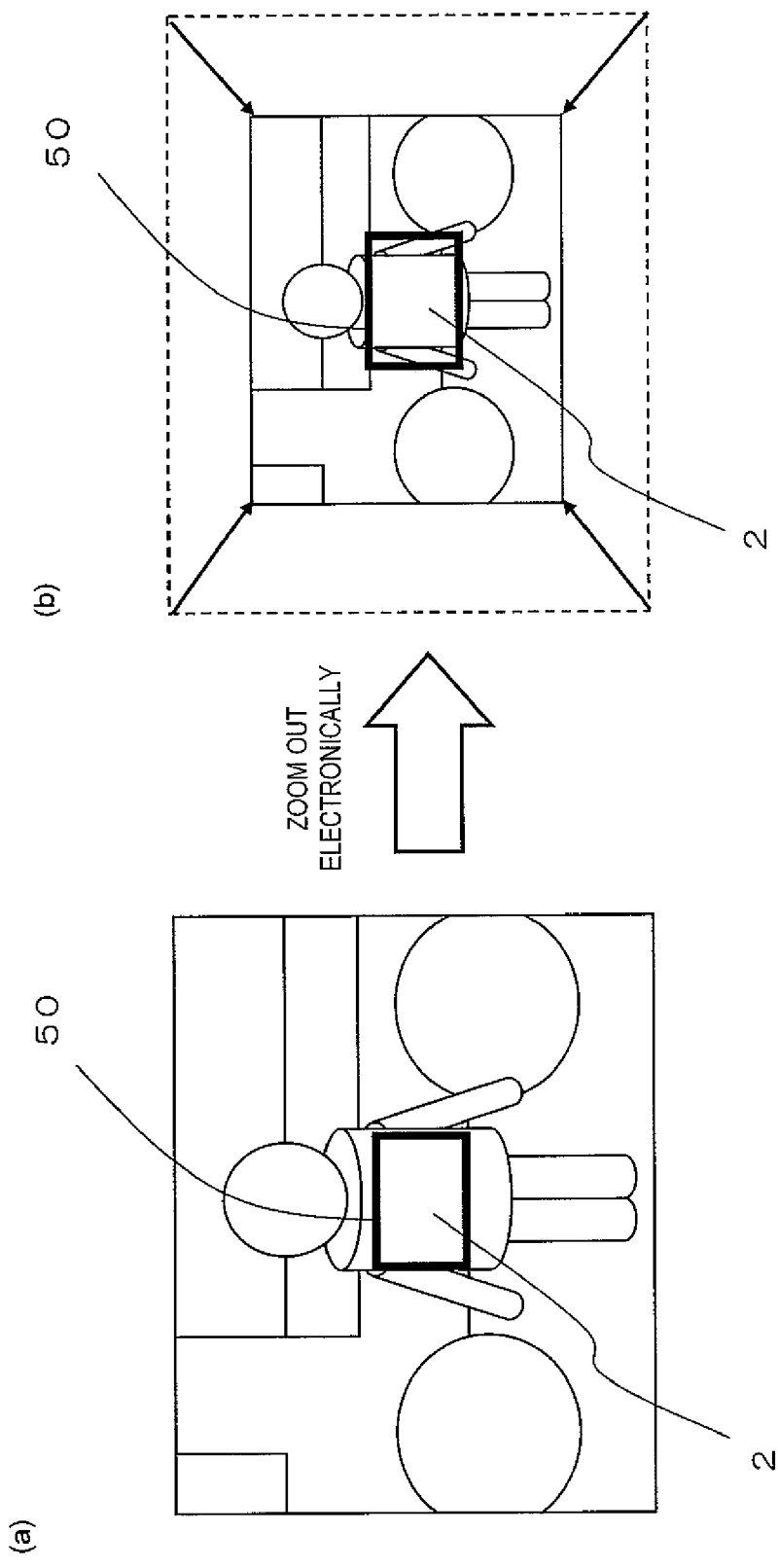

Portions (a) and (b) of FIG. 5 illustrate how the image data may be electronically zoomed out by electronic zooming processing according to a preferred embodiment of the present invention.

Figure 6:
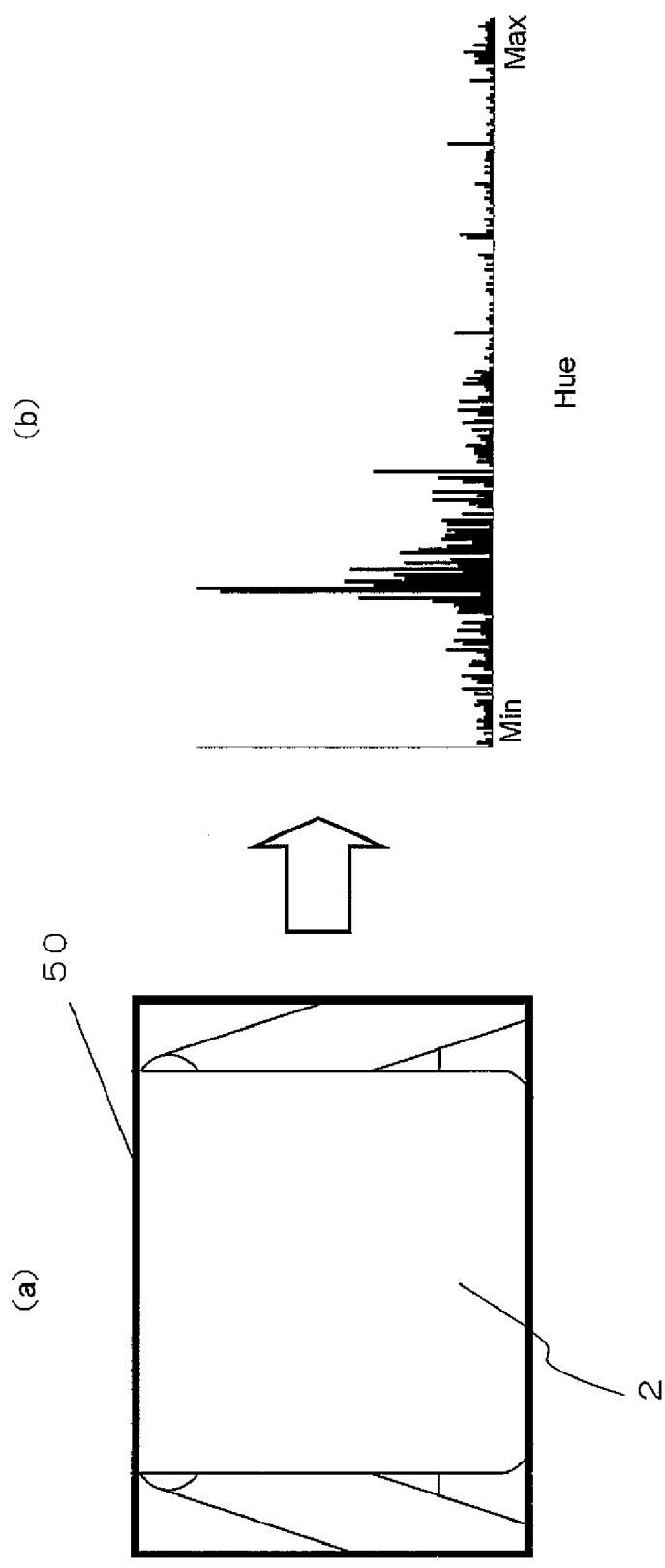

Portions (a) and (b) of FIG. 6 show the color information of the image data in the tracking area shown in portions (a) and (b) of FIG. 5.

Figure 7:
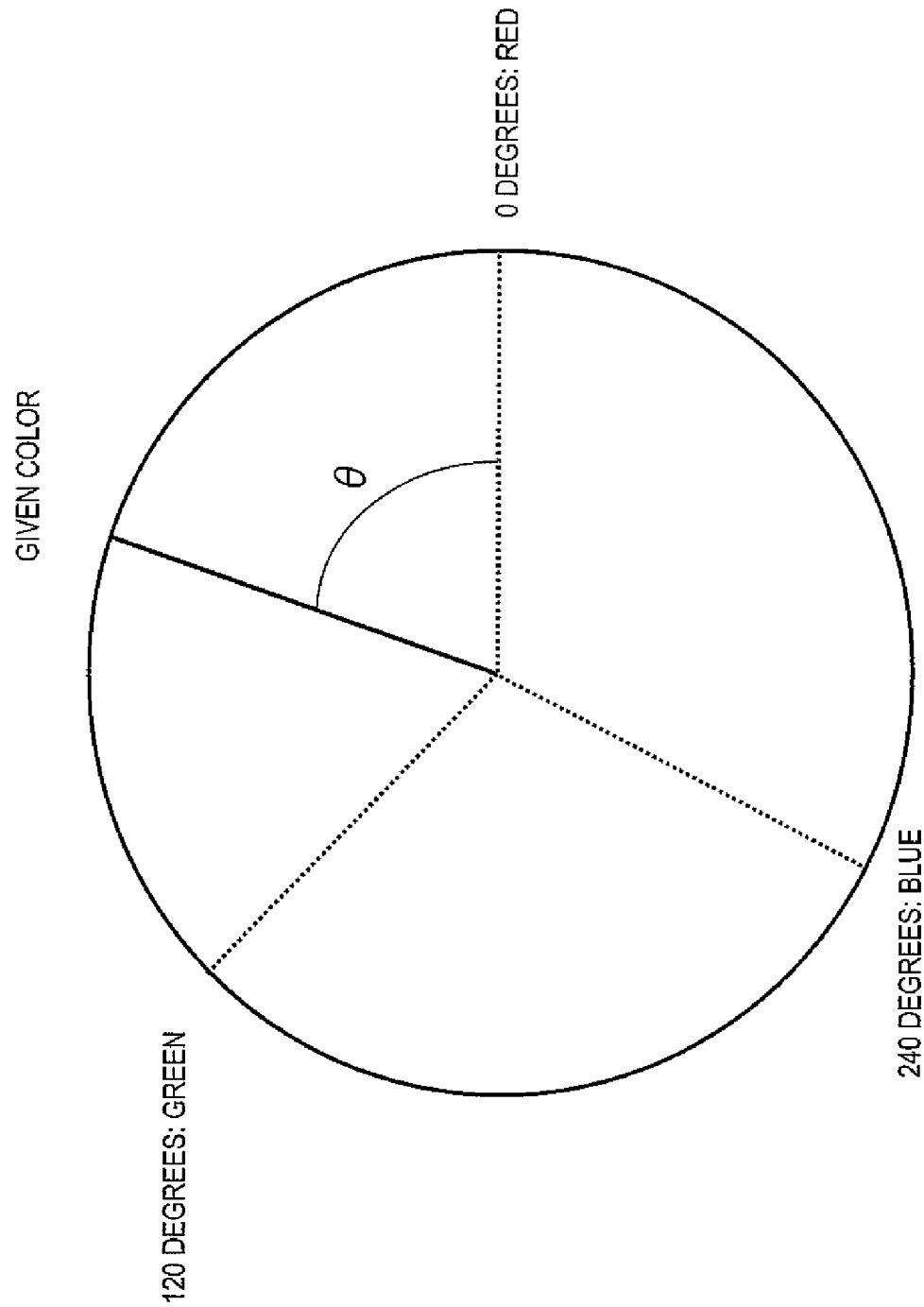

FIG. 7 shows a color phase space according to a preferred embodiment of the present invention.

Figure 4:
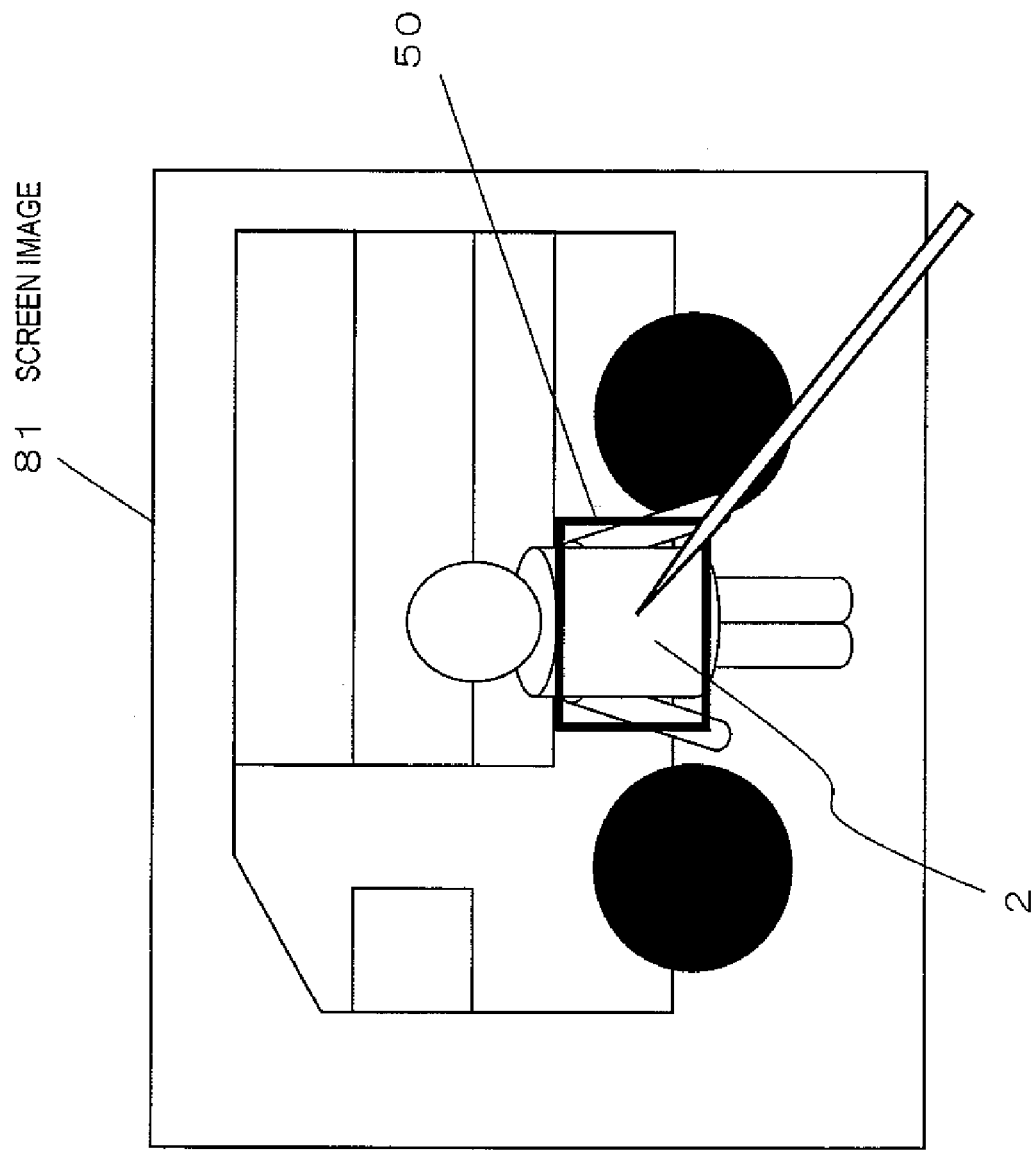
FIG. 4 illustrates how the image capture device 1 of the present invention may define a tracking area on the screen image.
Figure 8:
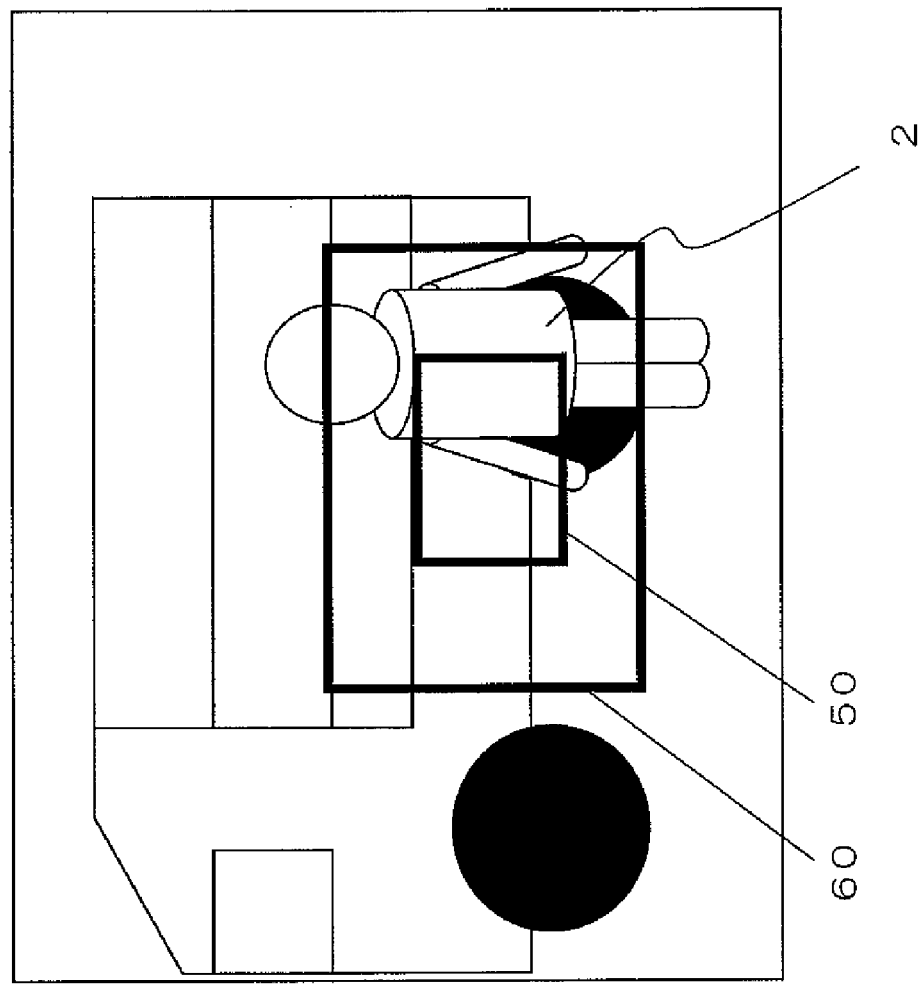

FIG. 8 illustrates how a search area may be defined in the preferred embodiment of the present invention shown in FIG. 4.

Figure 9:
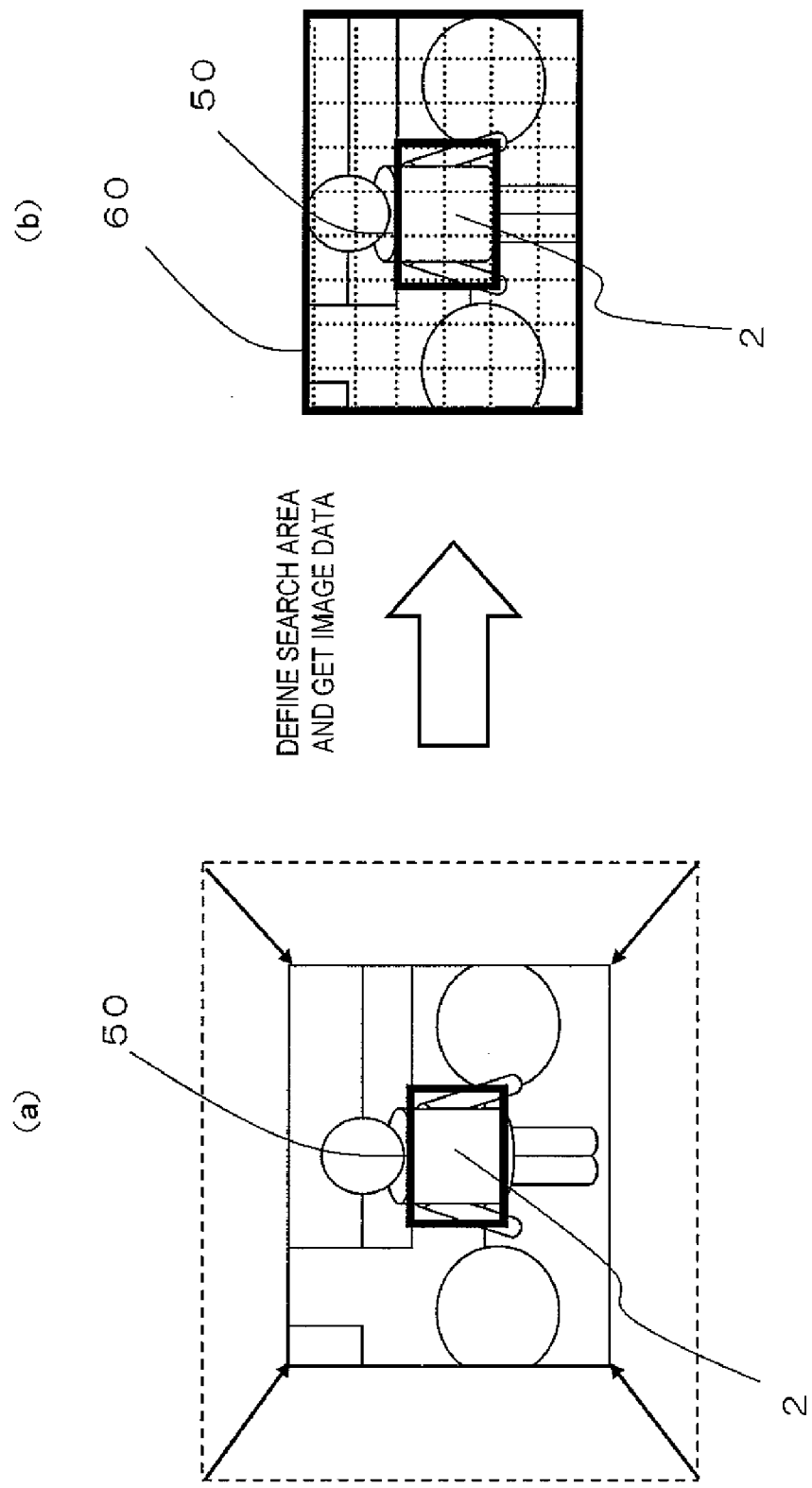

Portions (a) and (b) of FIG. 9 illustrate how a search area may be defined on the zoomed-out image data in the preferred embodiment of the present invention shown in portions (a) and (b) of FIG. 5.

Figure 10:
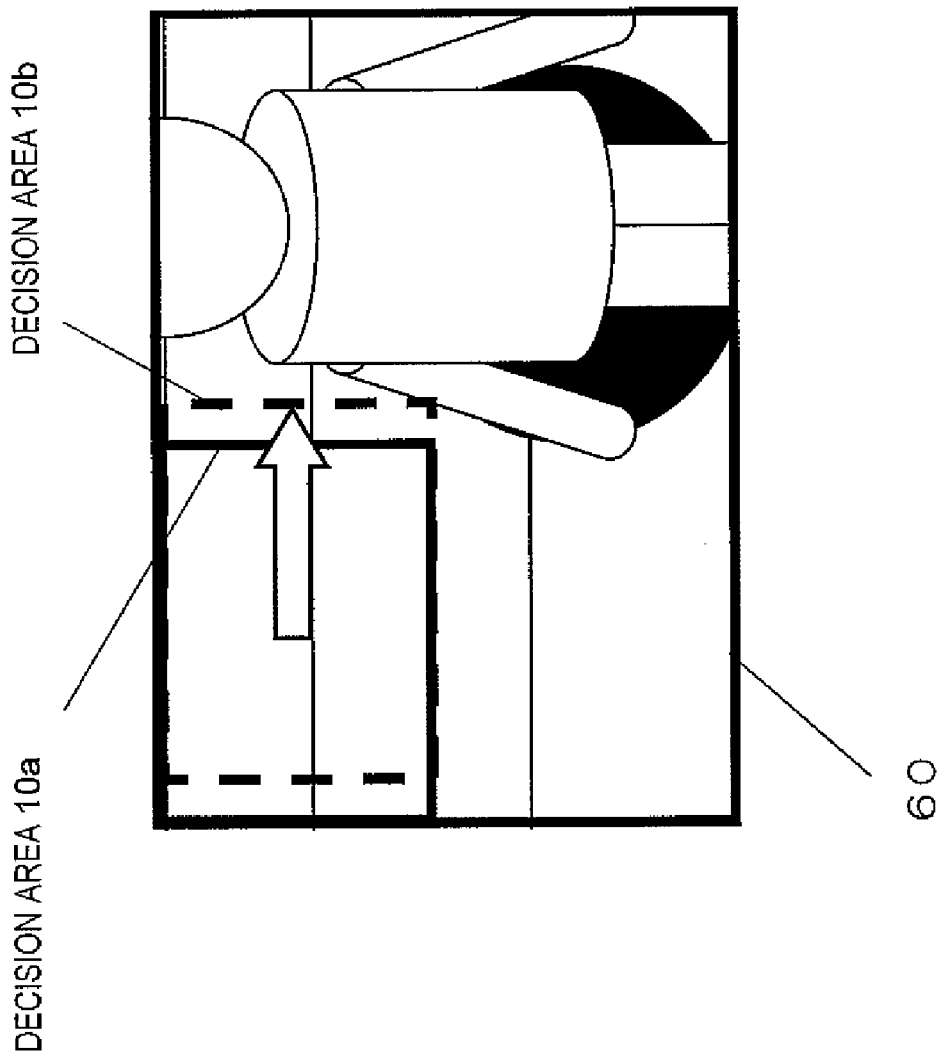
Figure 11:
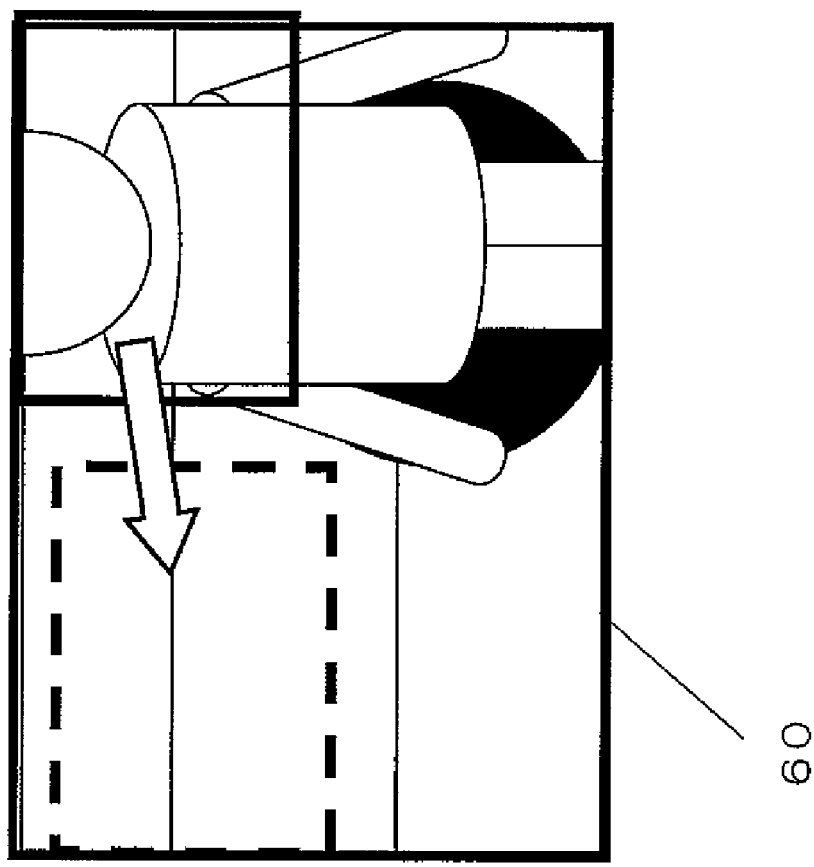

FIGS. 10 and 11 illustrate how to search for the most similar area in the preferred embodiment of the present invention.

Figures 12A, 12B:
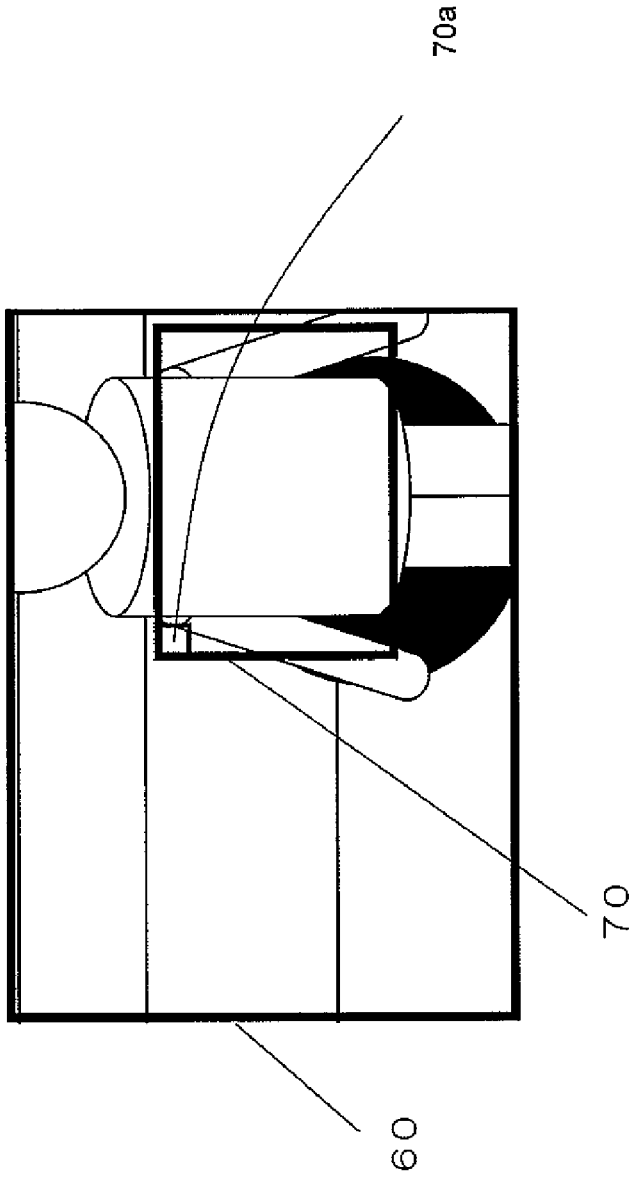

FIGS. 12A and 12B show typical pieces of information to be stored as information about the currently most similar area in the preferred embodiment of the present invention.

Figure 13:
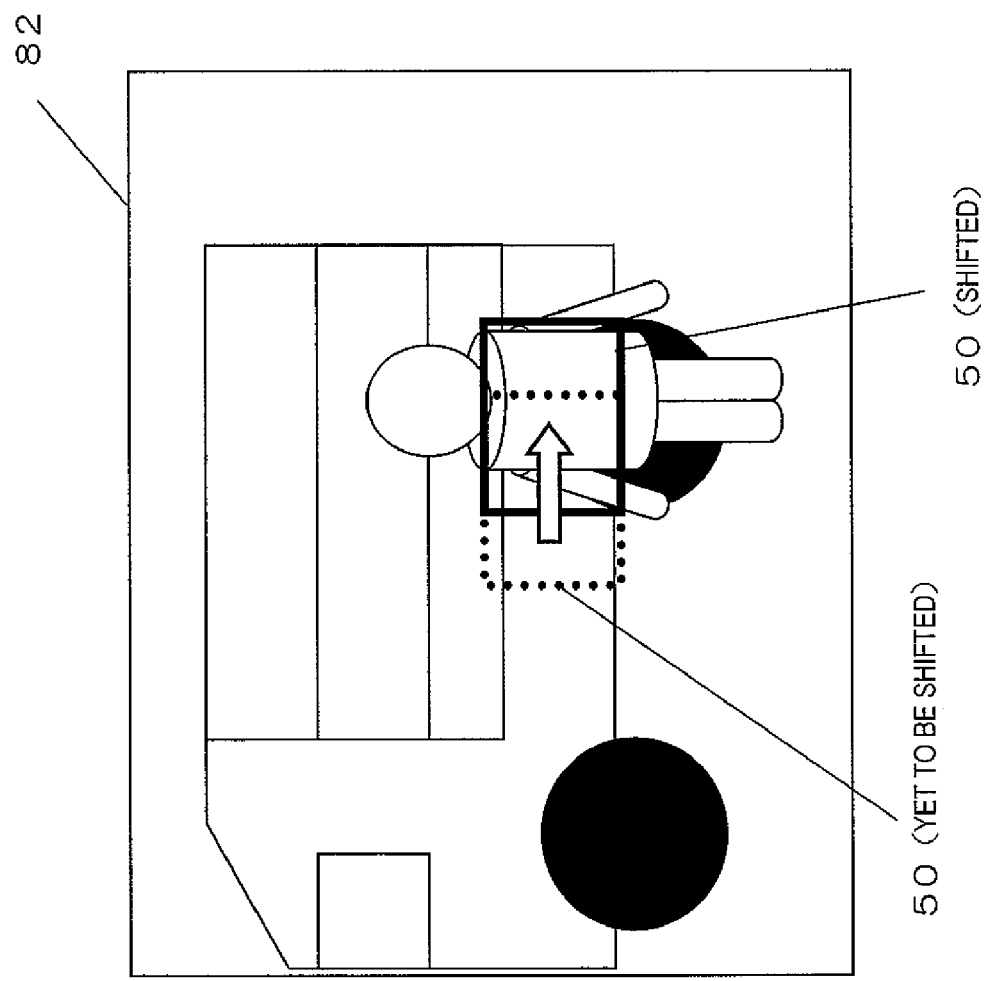

FIG. 13 illustrates an exemplary screen image on which the tracking area has been shifted in the preferred embodiment of the present invention.

Figure 14:
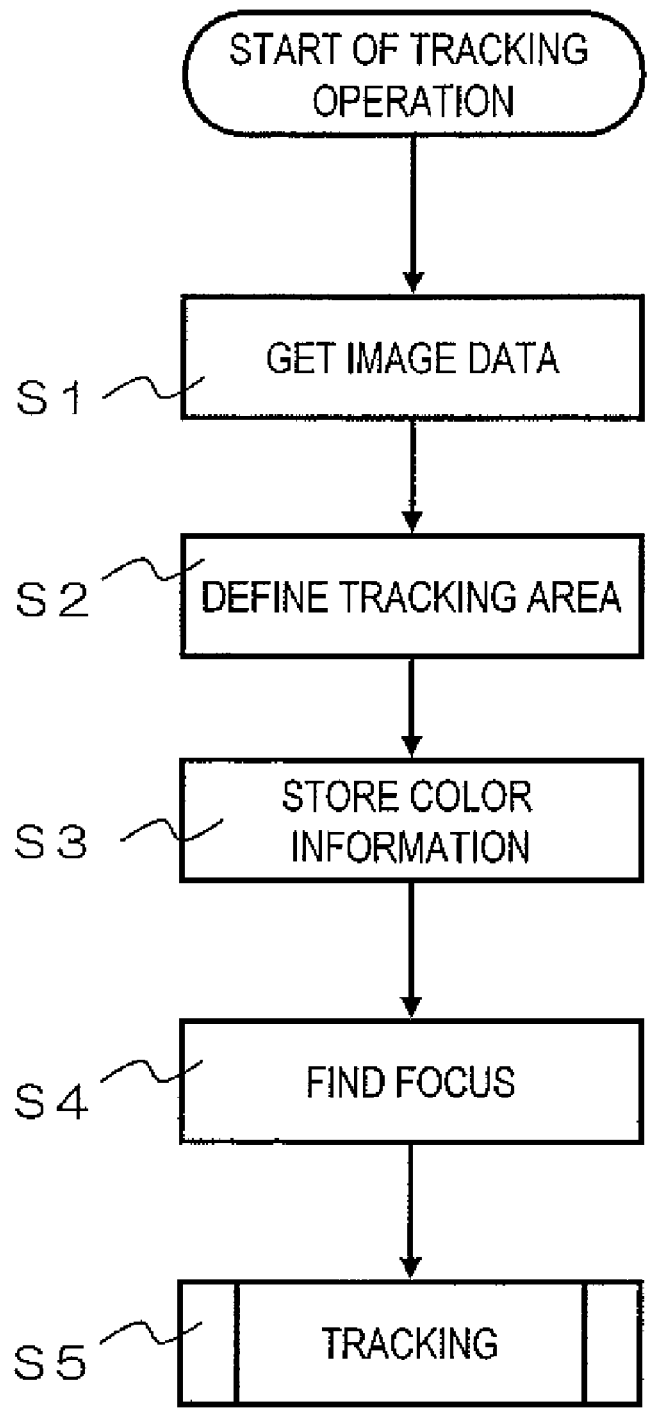

FIG. 14 is a flowchart showing a general operation of the image capture device 1 according to the preferred embodiment of the present invention.

Figure 15:
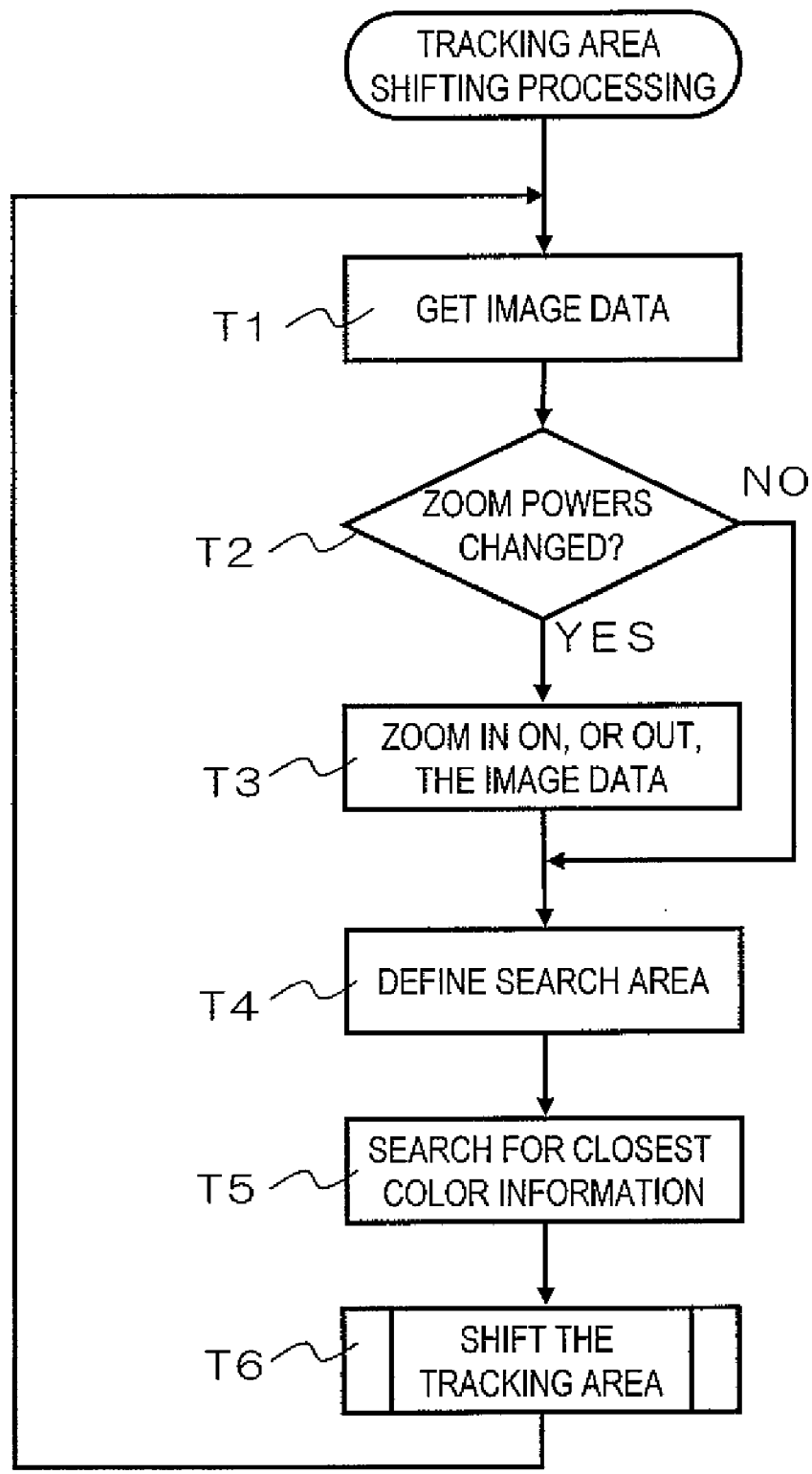

FIG. 15 is a flowchart showing a more specific operation of the image capture device 1 in the tracking processing S5 shown in FIG. 14.

Figure 16:
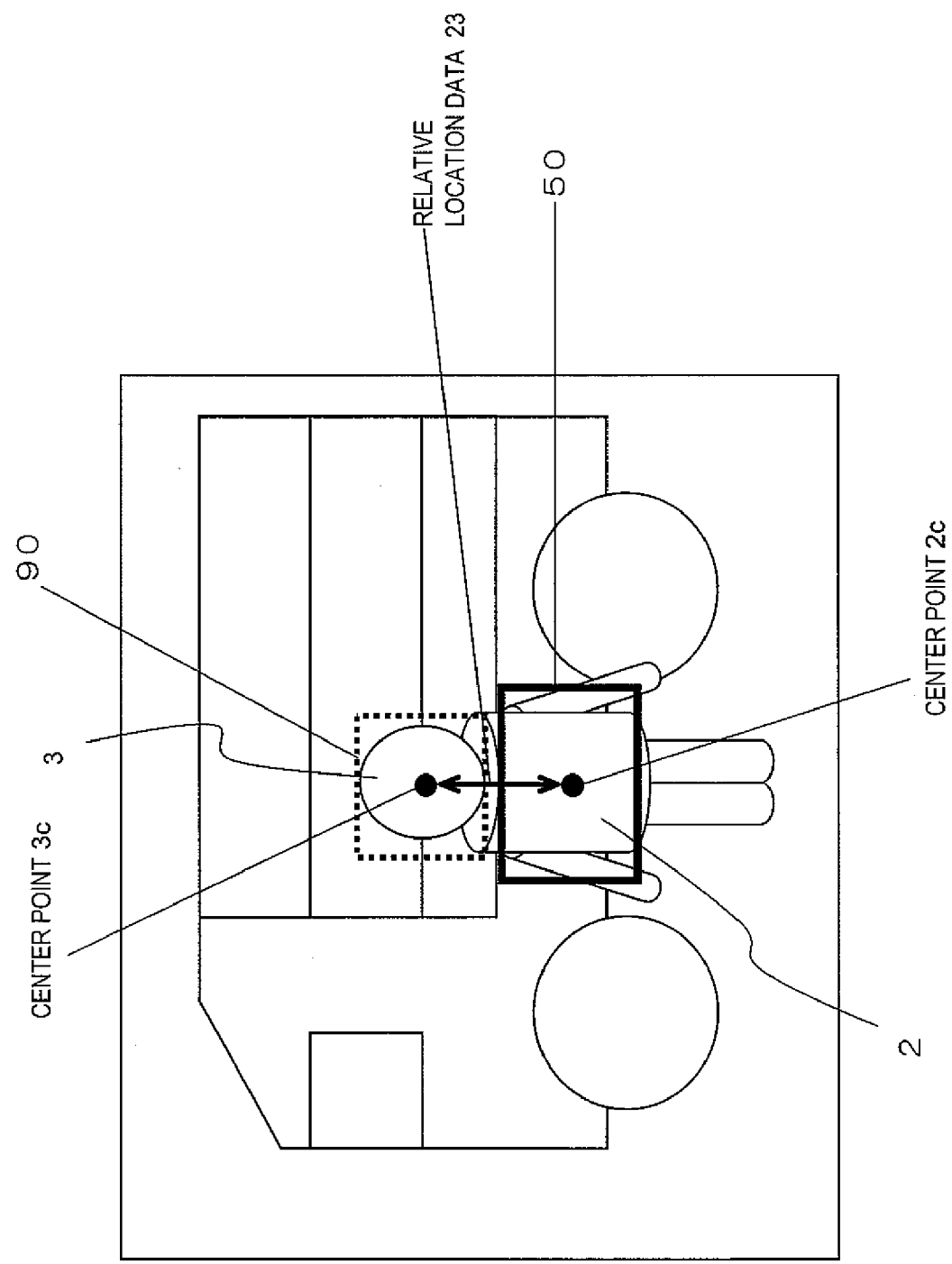

FIG. 16 illustrates the relative locations of face and tracking areas in the preferred embodiment of the present invention.

Figure 17:
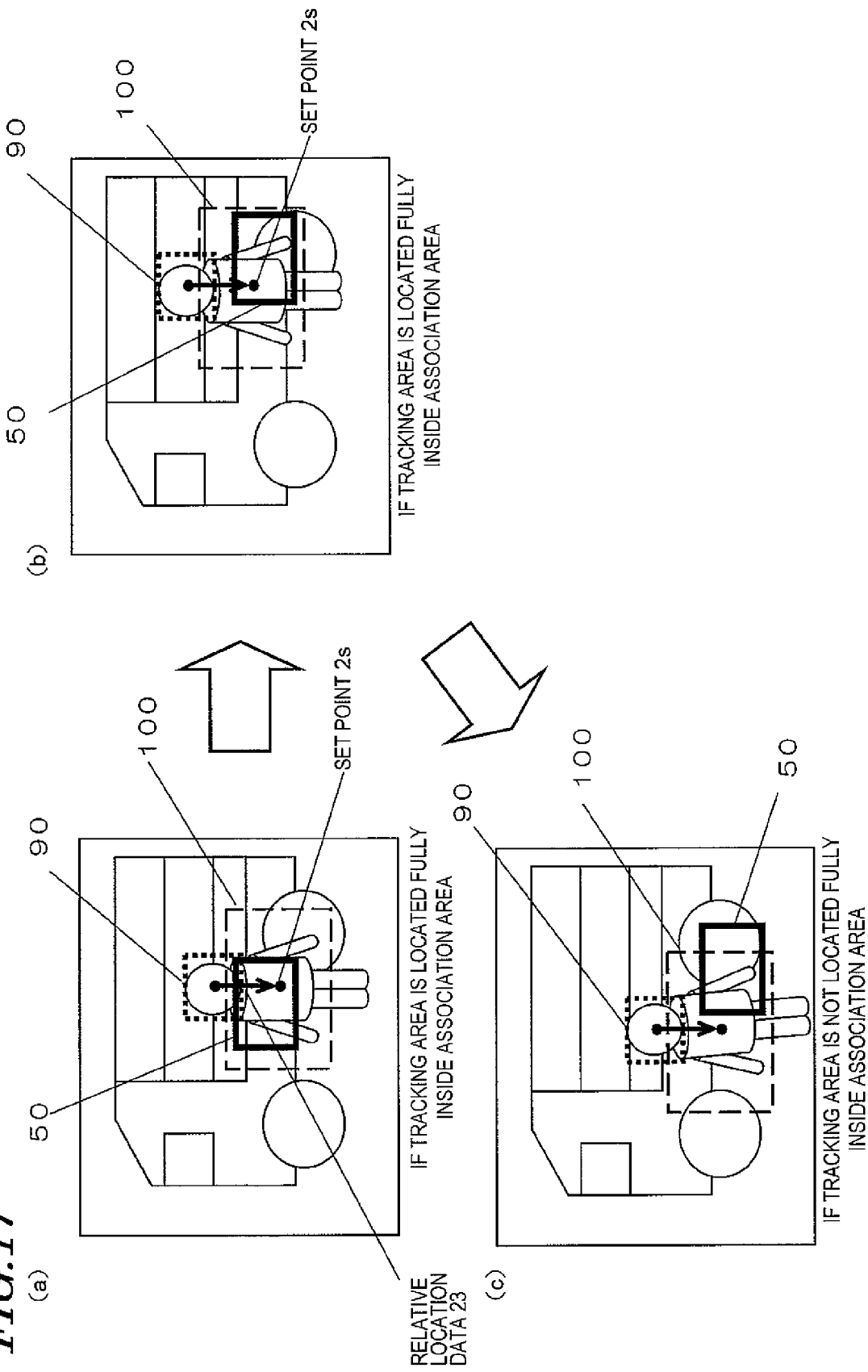

Portions (a), (b) and (c) of FIG. 17 illustrate how the face and tracking areas may get associated with each other in the preferred embodiment of the present invention.

Figure 18:
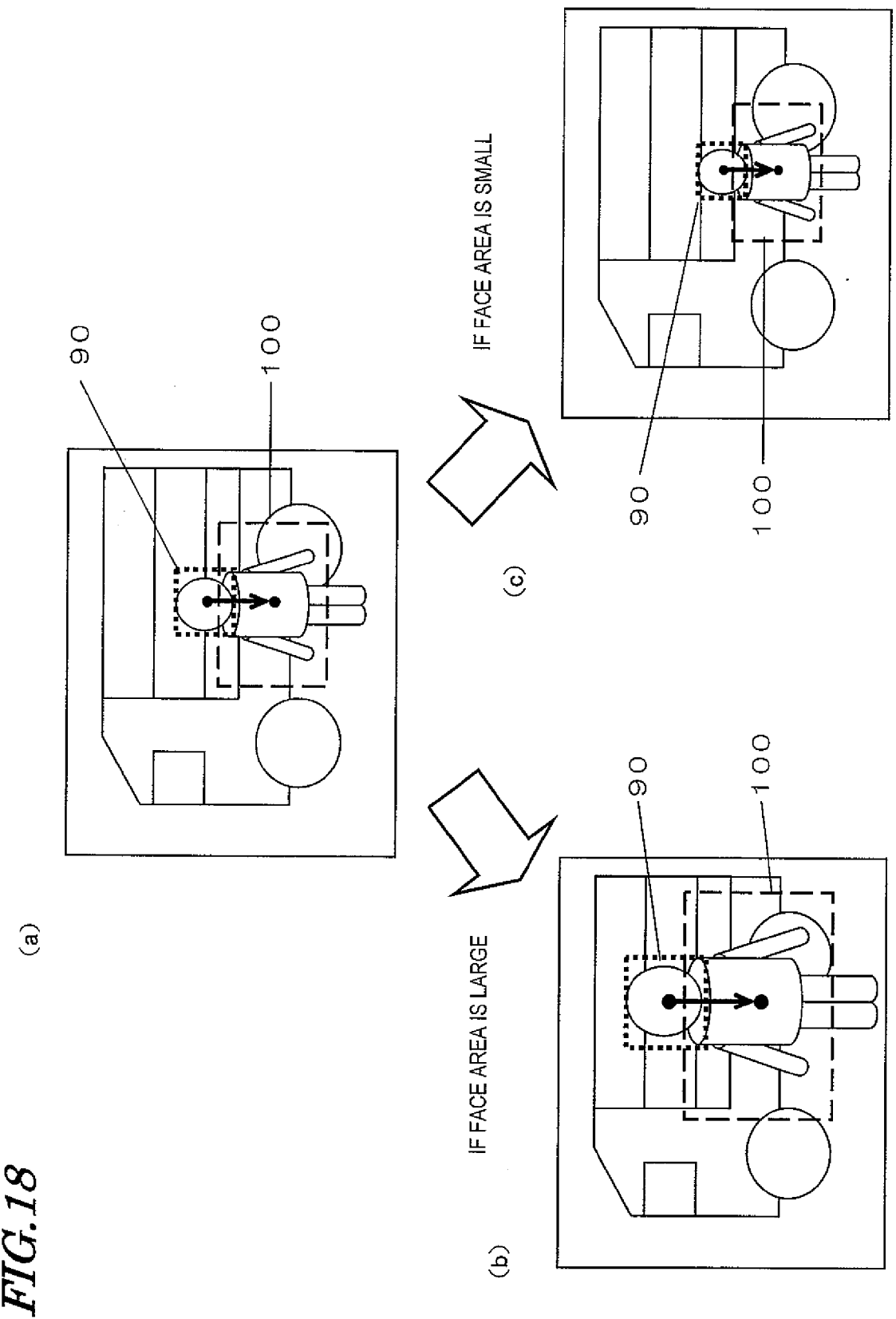

Portions (a), (b) and (c) of FIG. 18 illustrate how the relative locations and the size of the association area may change according to the size of the face area in the preferred embodiment of the present invention.

Figure 19:
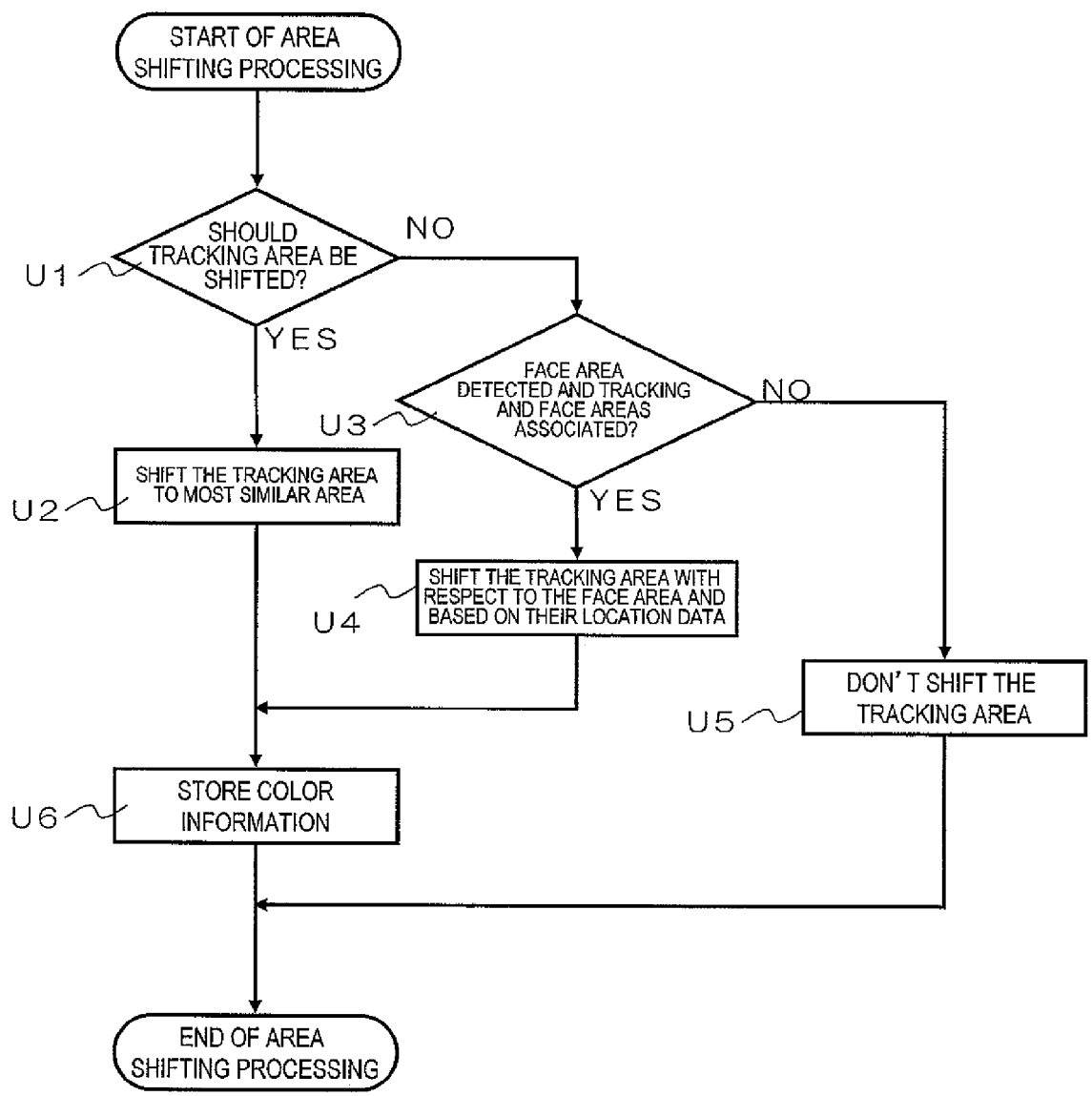

FIG. 19 is a flowchart showing the procedure in which the image capture device 1 of the present invention performs the area shifting processing.

Figure 20:
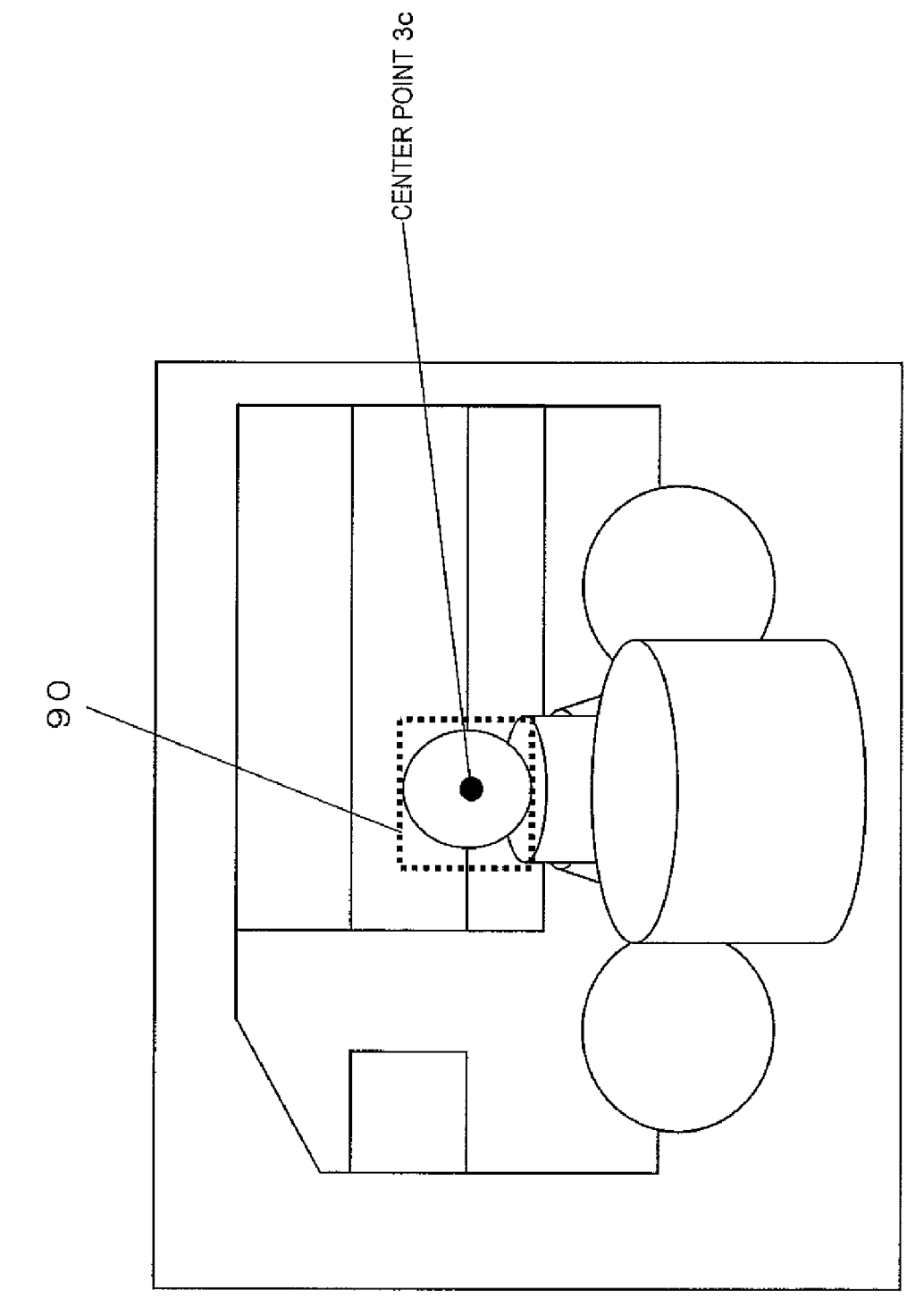

FIG. 20 illustrates an example of image data to be presented in a situation where the tracking operation has failed in the preferred embodiment of the present invention.

Figure 21:
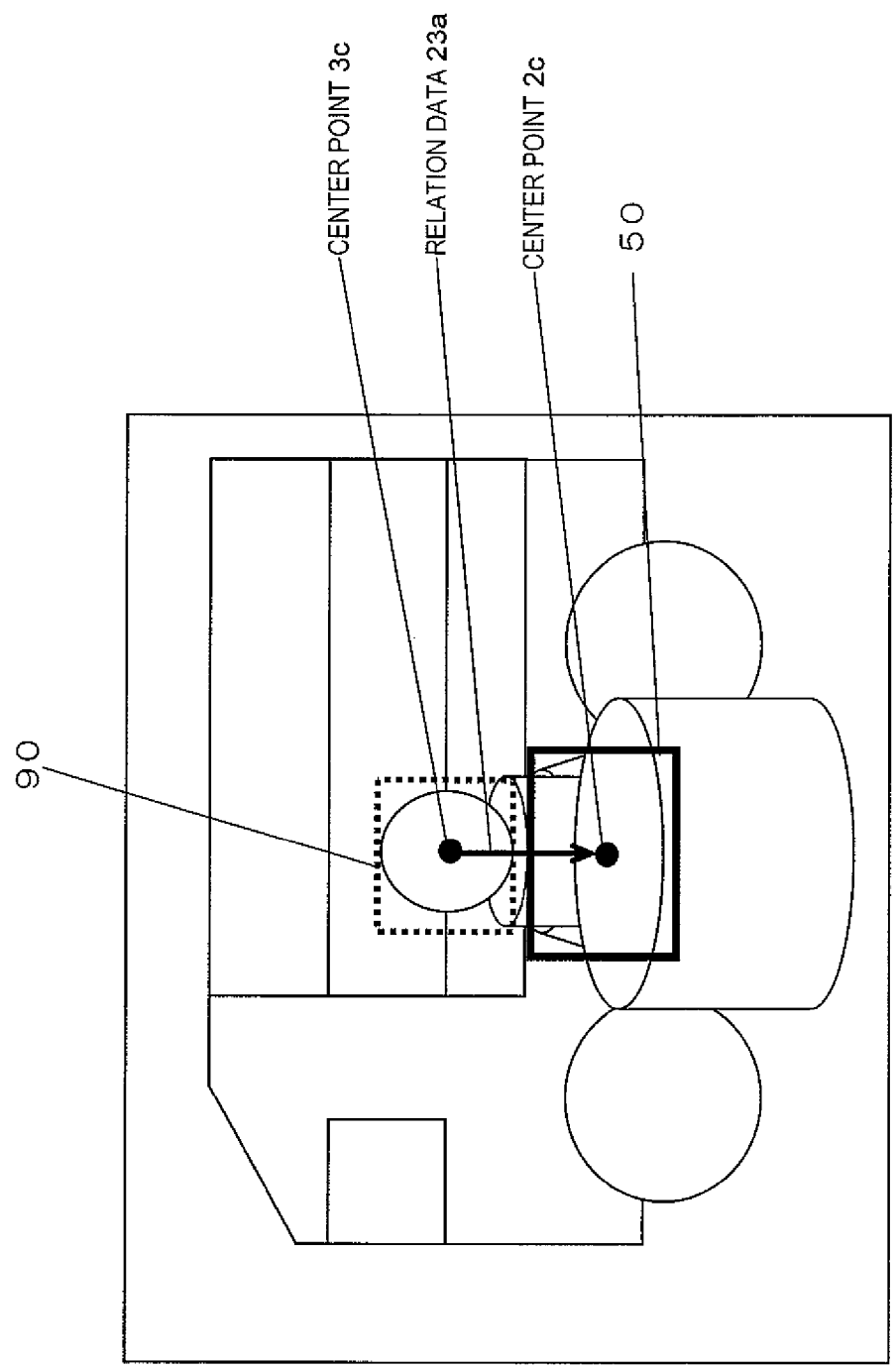

FIG. 21 illustrates how the location of a tracking area may be estimated with respect to the location of a face area on the image data and based on the statistically defined location data of the face and tracking areas in the preferred embodiment of the present invention.

Figure 22:
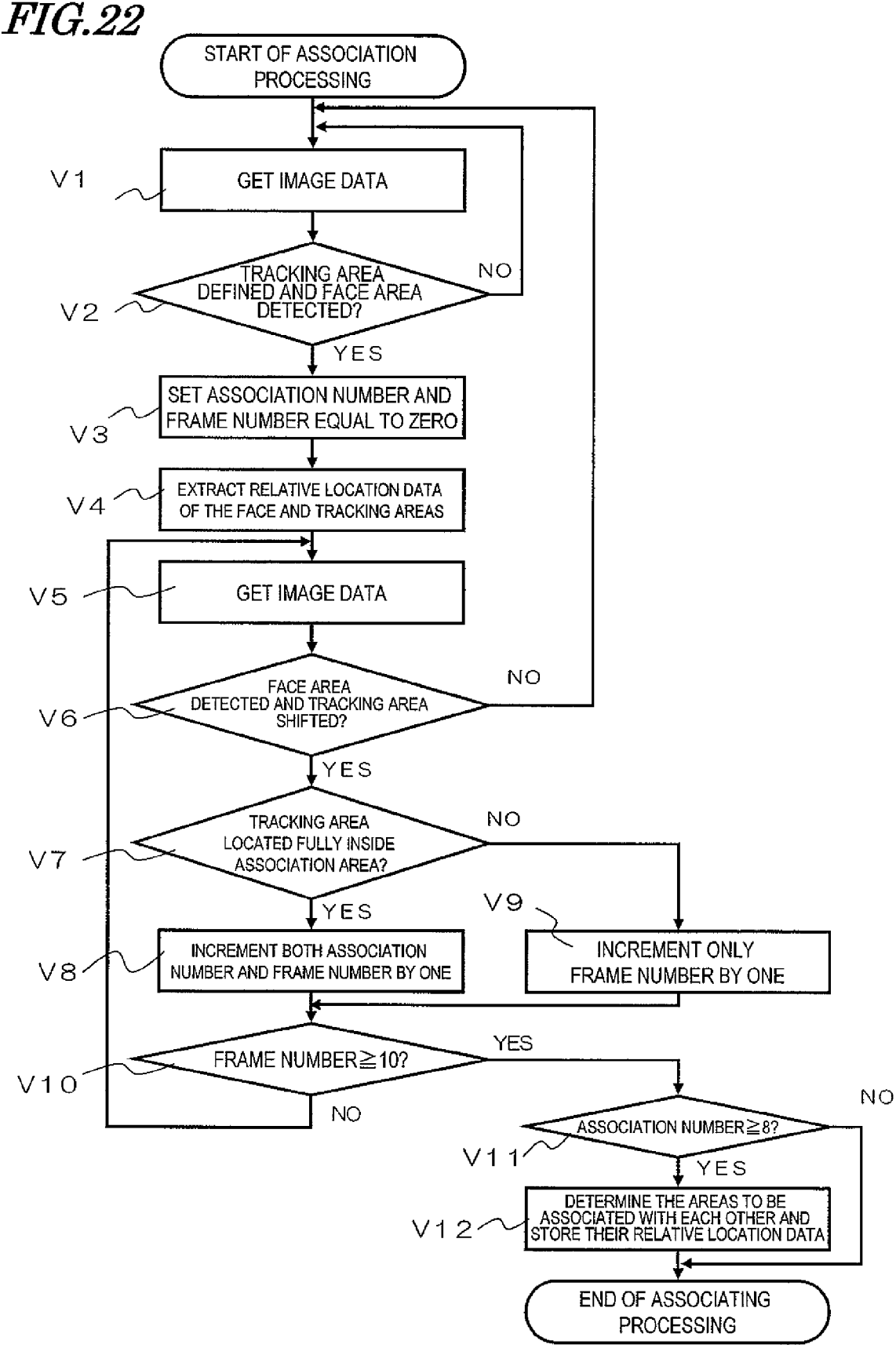

FIG. 22 is a flowchart showing the procedure in which the image capture device 1 of the present invention carries out association processing.

Figure 23:
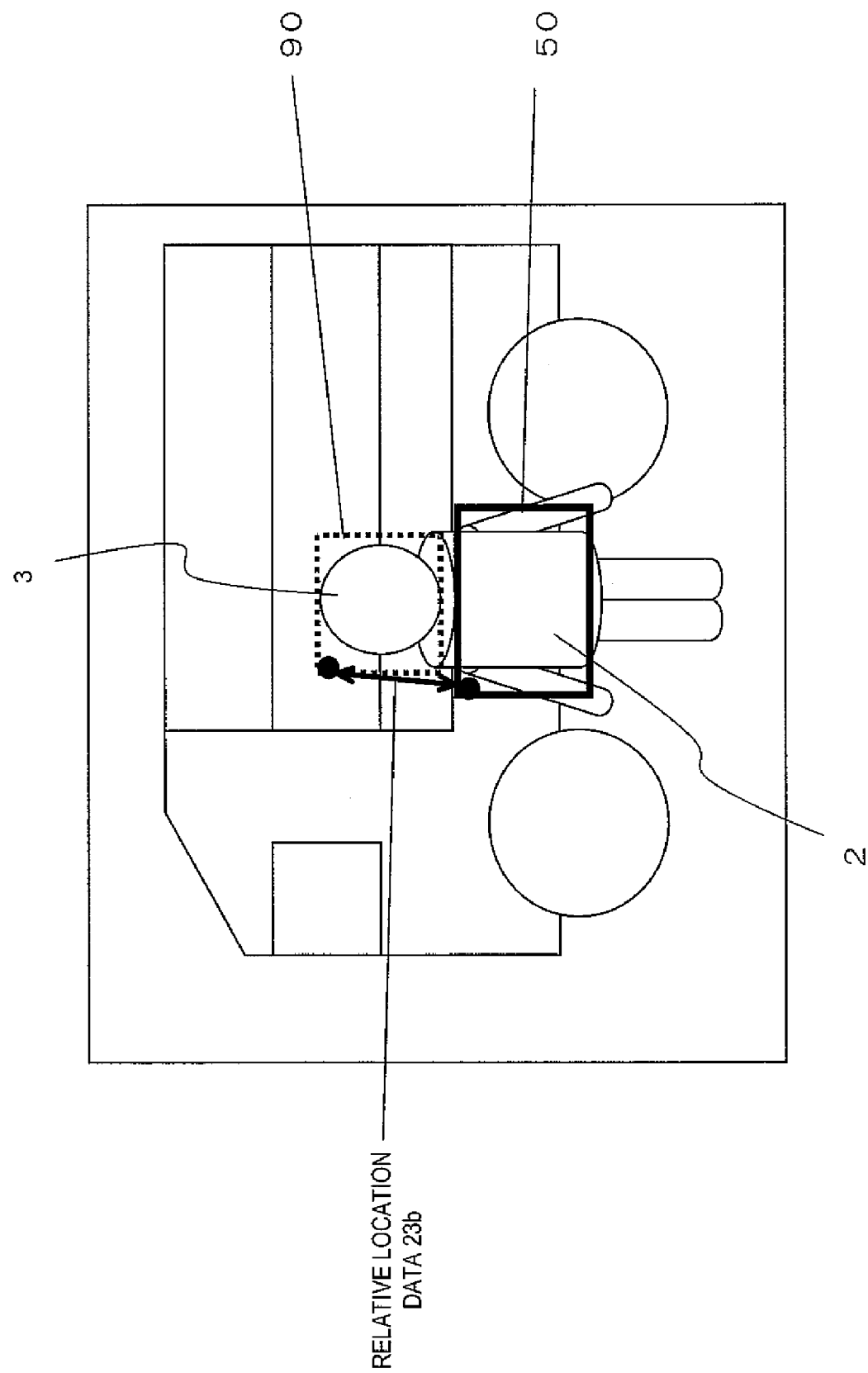

FIG. 23 illustrates the relative locations of face and tracking areas in the preferred embodiment of the present invention.

Figure 24:
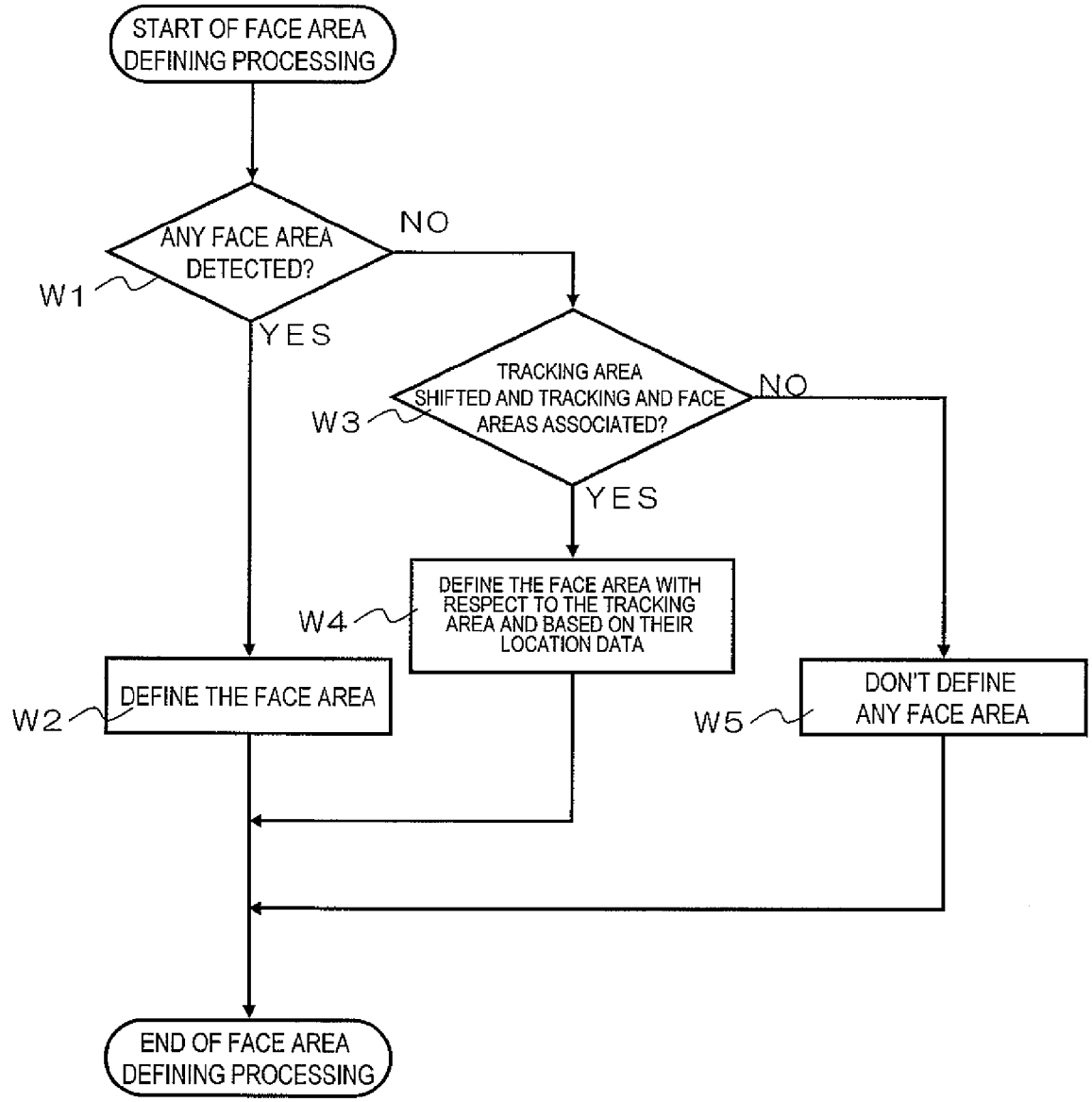

FIG. 24 is a flowchart showing the procedure in which the image capture device 1 of the present invention performs face area defining processing.

Figure 25:
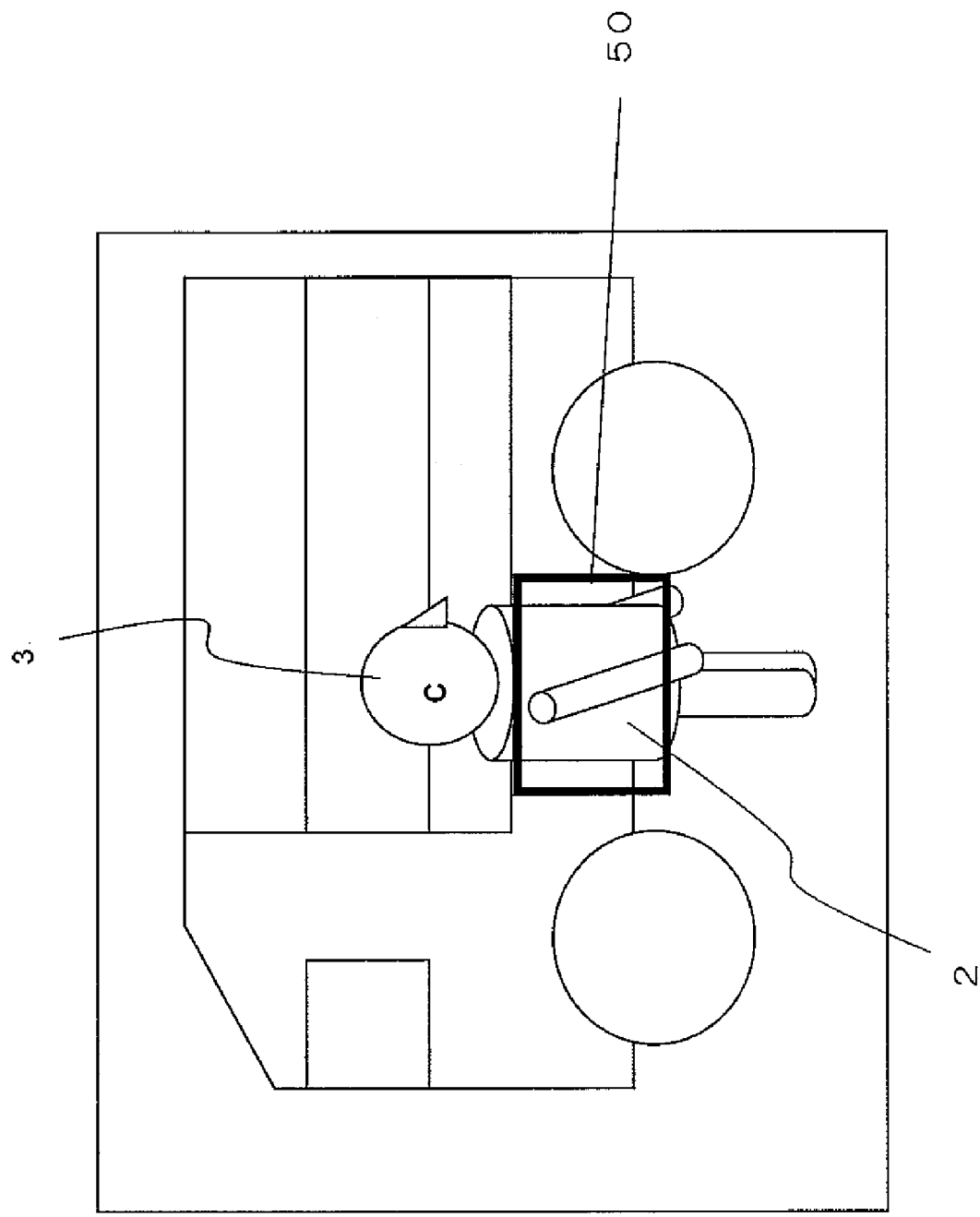

FIG. 25 illustrates what image data may be presented on the screen if no face areas have been detected in the preferred embodiment of the present invention.

Figure 26:
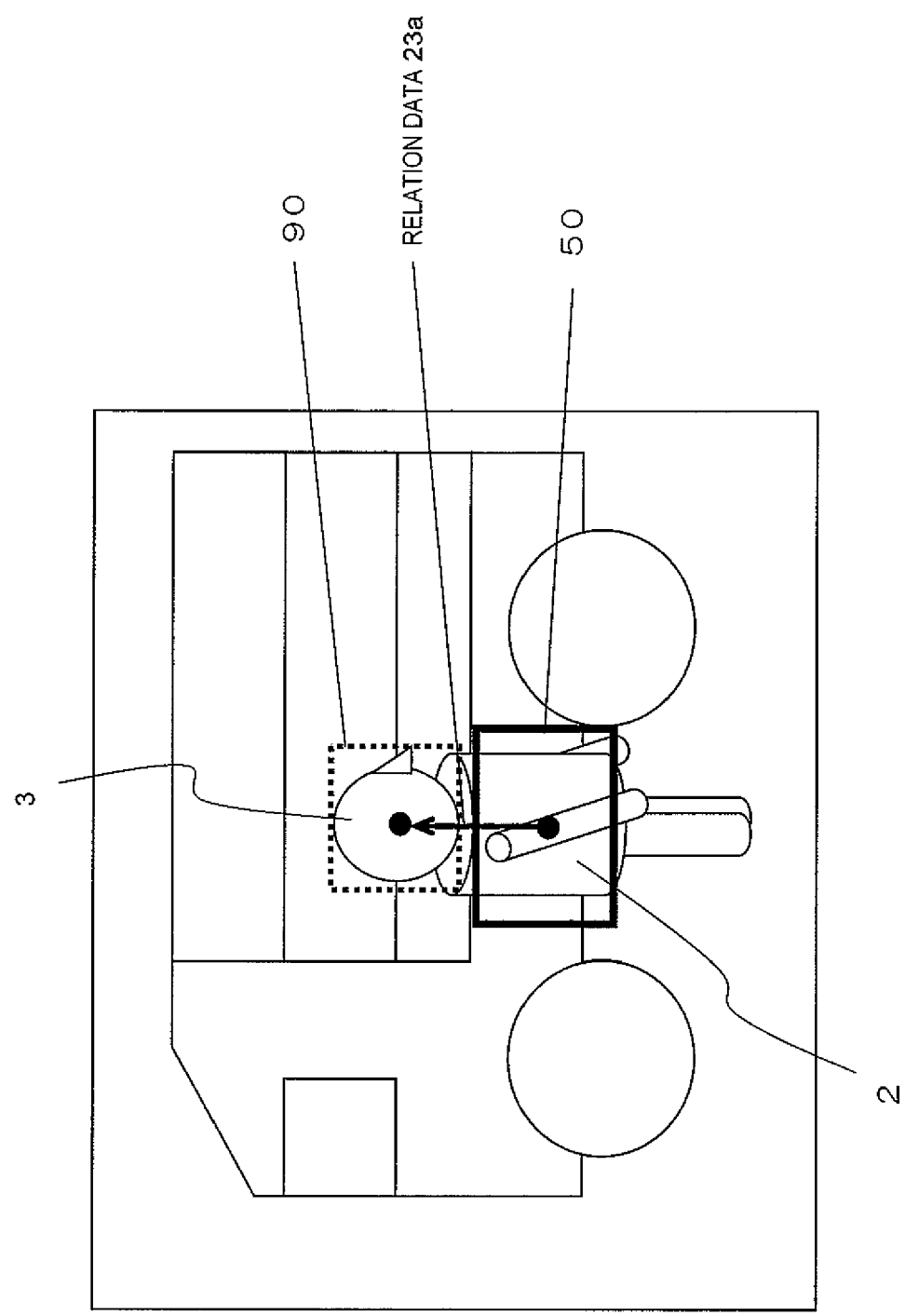

FIG. 26 illustrates how the location of a face area may be estimated with respect to the location of a tracking area on the image data and based on the statistically defined location data of the face and tracking areas in the preferred embodiment of the present invention.

Figure 27A:
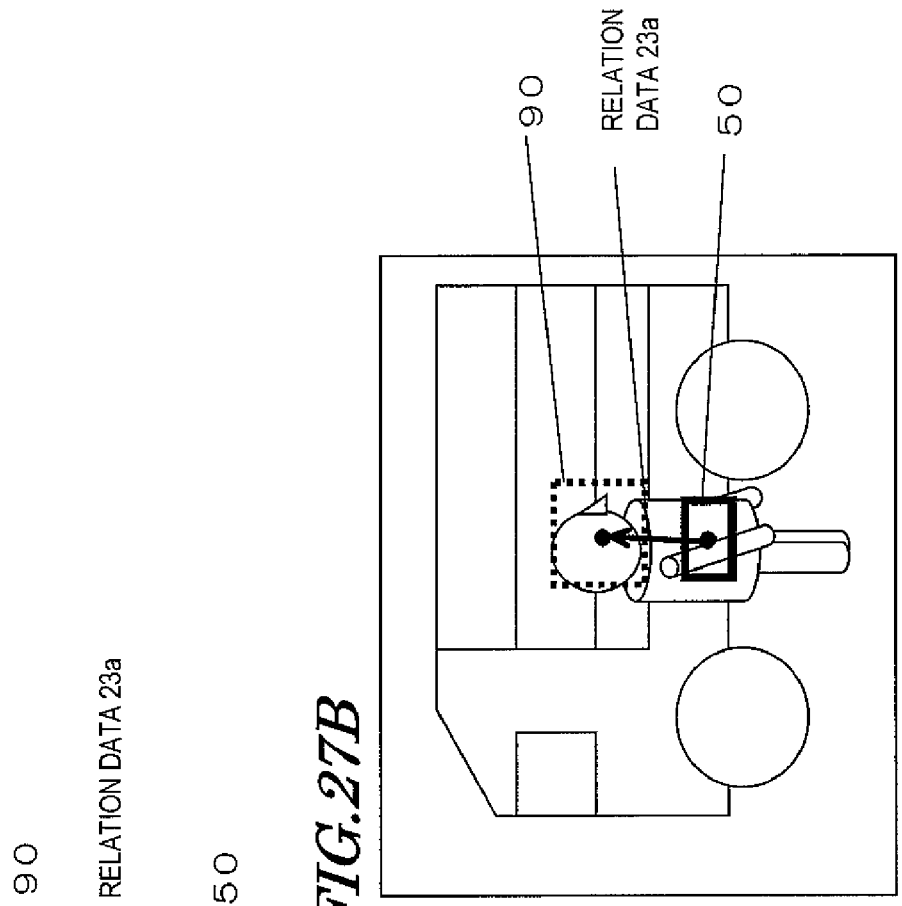
Figure 27B:
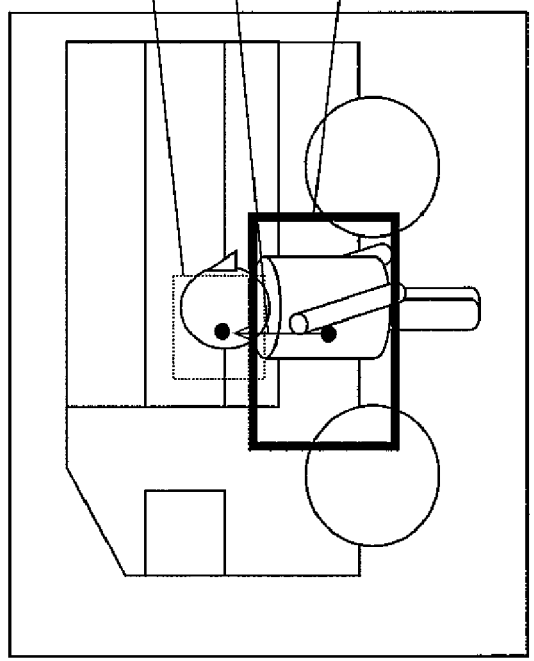

FIGS. 27A and 27B illustrate how the location of a face area may be estimated with respect to that of a tracking area in the preferred embodiment of the present invention.

Figure 28:
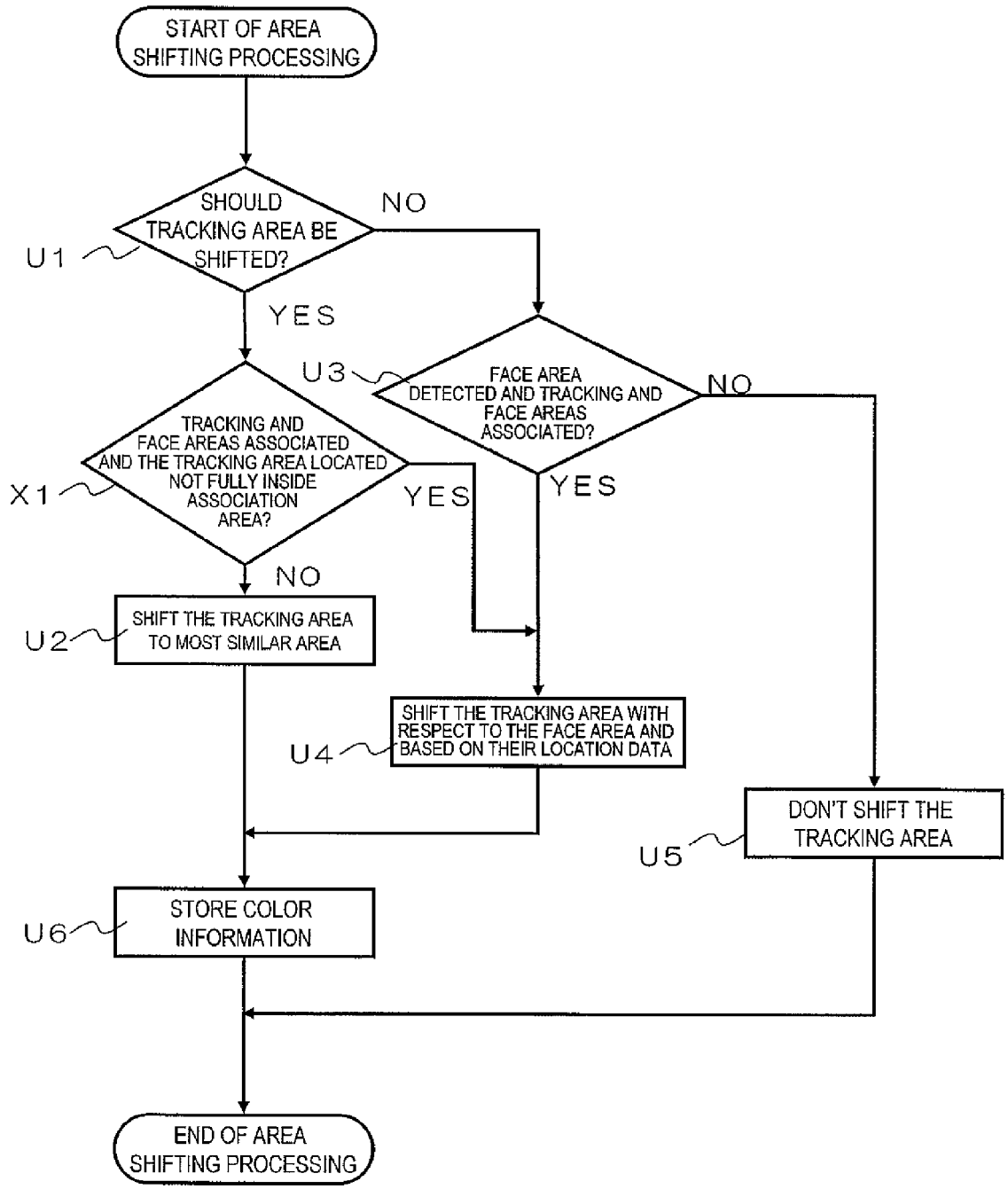

FIG. 28 is a flowchart showing the procedure in which the image capture device 1 of the present invention carries out area shifting processing in the preferred embodiment of the present invention.

DETAILED DESCRIPTION OF PREFERRED EMBODIMENTS

Hereinafter, preferred embodiments of the present invention will be described with reference to the accompanying drawings.

1. Configuration 1-1. General Appearance

Figure 1:
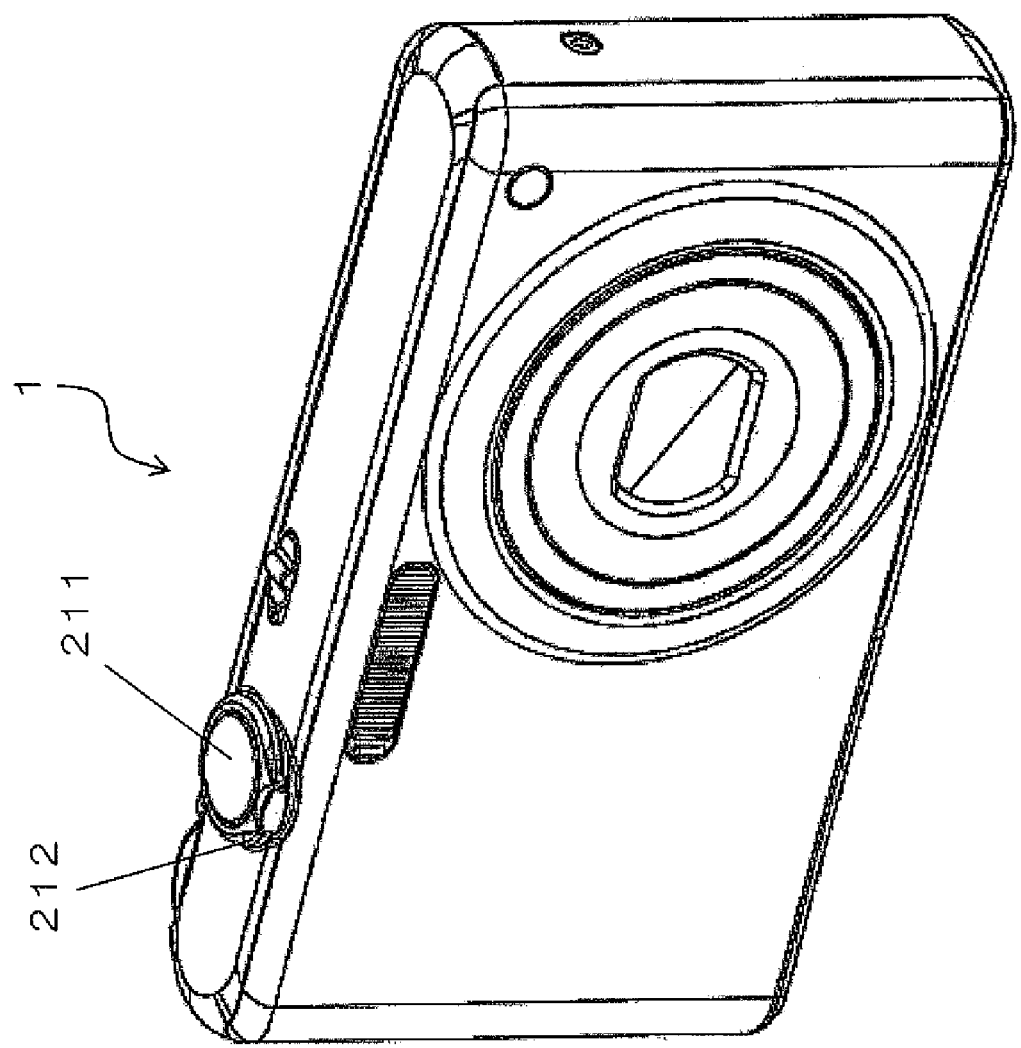
FIG. 1 is a perspective view illustrating an image capture device 1 as a specific preferred embodiment of the present invention.
Figure 2:
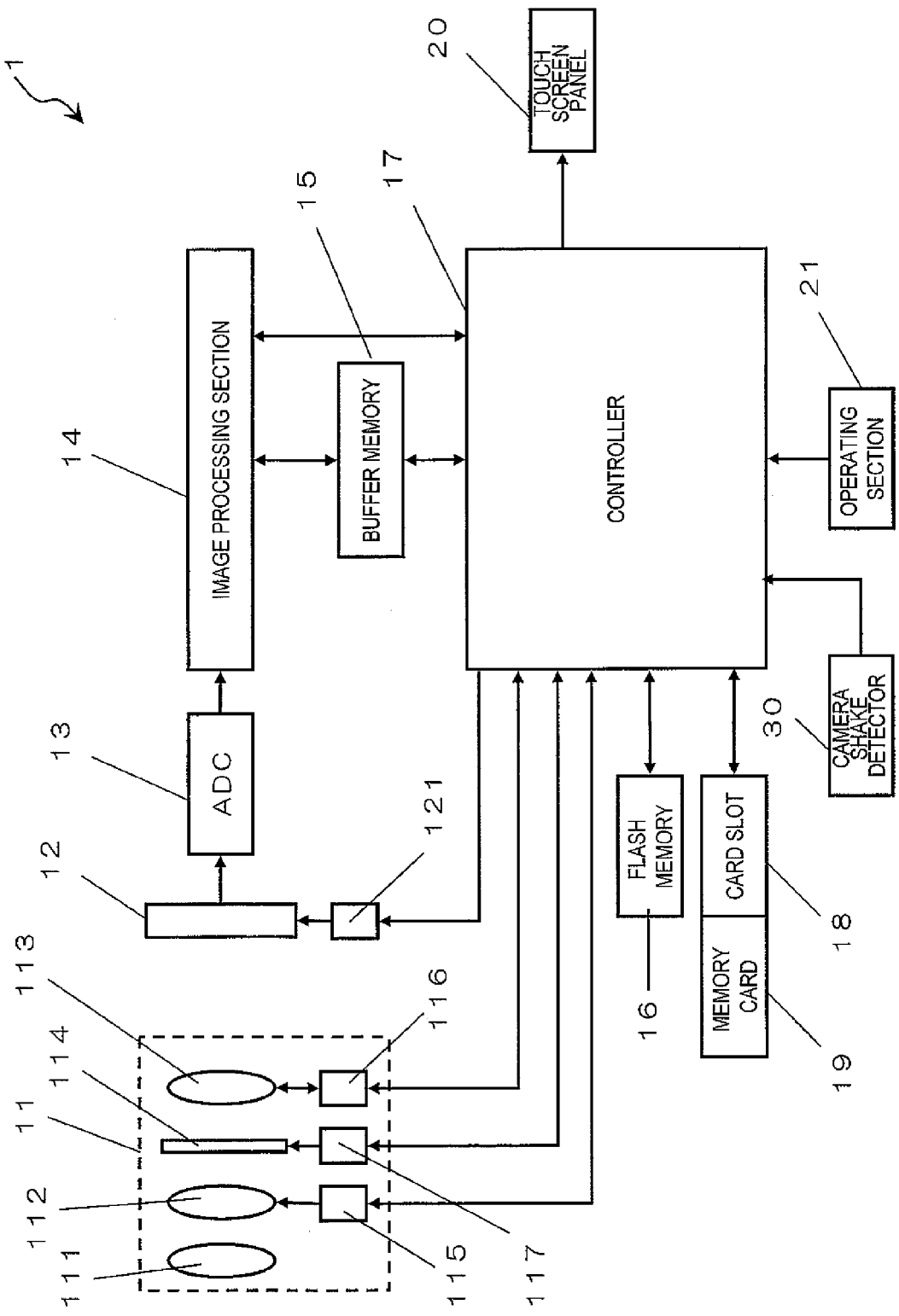
FIG. 2 is a block diagram showing the arrangement of respective components of the image capture device 1 of the present invention shown in FIG. 1.

FIG. 1 is a perspective view illustrating an image capture device 1 as a specific preferred embodiment of the present invention. The image capture device 1 may be a digital camera as illustrated in FIG. 1, but may also be implemented as a camcorder. FIG. 2 is a block diagram showing the arrangement of respective components of the image capture device 1 of this preferred embodiment. Hereinafter, the configuration and operation of the image capture device will be described.

The image capture device 1 includes an optical system 11, which condenses incoming light that has come from the subject, thereby producing a subject's image on a CCD image sensor 12. The optical system 11 includes an objective lens 111, a zoom lens 112, a focus lens 113, and a lens stop/shutter 114.

The zoom lens 112 is driven by a zoom driving section 115 to adjust the viewing range (or the angle of view) of the subject. In other words, the zoom lens 112 adjusts the focal length. The focus lens 113 is driven by a focus driving section 116 to adjust the focus. The zoom driving section 115 includes a cam mechanism for moving the zoom lens 112 and an actuator for driving the cam mechanism. In response to a control signal supplied from a controller 17, the zoom driving section 115 drives the zoom lens 112. The focus driving section 116 includes a cam mechanism for moving the focus lens 113 and an actuator for driving the cam mechanism. In response to a control signal supplied from the controller 17, the focus driving section 116 drives the focus lens 113.

The lens stop/shutter 114 is a member that functions as both a lens stop and a shutter. The lens stop/shutter 114 is driven by a lens stop/shutter driving section 117. The lens stop may be made up of five blades and adjusts the amount of light that is going to pass through the optical system 11. Meanwhile, the shutter adjusts the amount of light falling on the CCD image sensor 12 temporally by being opened and shut repeatedly. The lens stop/shutter driving section 117 includes a cam mechanism and an actuator for driving the cam mechanism. In response to a control signal supplied from the controller 17, the lens stop/shutter driving section 117 drives the lens stop/shutter 114.

The image capture device 1 of this preferred embodiment includes the lens stop/shutter 114 that functions as both a lens stop and a shutter. However, the present invention is in no way limited to that specific preferred embodiment. Alternatively, a lens stop and a shutter may be provided separately from each other. In that case, only the lens stop may be arranged inside of the optical system with the shutter arranged outside of it, e.g., between the optical system and the CCD image sensor. If the shutter and the optical system are arranged separately from each other, the present invention is also applicable to a digital camera, of which the lens is replaceable.

The CCD image sensor 12 is an image capturing section for capturing a subject's image that has been produced by the optical system 11, thereby generating image data. The image data is either a moving picture or a still picture. The CCD image sensor 12 captures a subject's image and generates image data in response to a pulse signal supplied from a timing generator 121, which may be implemented as an integrated circuit such as an LSI to supply the pulse signal to the CCD image sensor 12. For example, the timing generator 121 may supply a pulse signal, instructing that 30 frames be read per second, to the CCD image sensor 12. As a result, the CCD image sensor 12 can get a frame of the image data every one-thirtieth seconds.

Next, an A/D converter 13 converts the image data that has been generated by the CCD image sensor 12 into digital data.

Then, an image processing section 14 subjects the digital image data to predetermined types of processing, which may include, but are not limited to, gamma transformation, YC conversion, electronic zoom processing, compression and expansion. In this preferred embodiment, the processing of detecting a feature such as a face or a color from given image data is supposed to be performed by the controller 17 as will be described later. However, that processing may also be carried out by the image processing section 14.

The image capture device 1 further includes a buffer memory 15 and a flash memory 16. While the image processing section 14 is performing the image processing and while the controller 17 is performing the control processing, the buffer memory 15 functions as a work memory. The buffer memory 15 may be implemented as a DRAM, for example.

The flash memory 16 may be used as a built-in memory, and stores not only the image data that has been subjected to the image processing but also programs, settings and so on for the control operations to get done by the controller 17.

The controller 17 is a control section for controlling the overall operation of the image capture device 1. The controller 17 may be implemented as a microcomputer or hard-wired circuits. In short, the controller 17 may be implemented in any form as long as it can control the image capture device itself. Various sorts of processing to be performed by the controller 17 will be described later.

The image capture device 1 further includes a camera shake detector 30, which is a vibration sensor for sensing the vibrations of the image capture device itself and may include gyro sensors, for example. The camera shake detector 30 includes a first gyro sensor for detecting the vertical rotations and vibrations of the image capture device 1 around its horizontal axis and a second gyro sensor for detecting the horizontal rotations and vibrations of the image capture device 1 around its perpendicular axis. On sensing these vibrations of the image capture device 1 itself, the camera shake detector 30 outputs an analog signal representing the magnitudes of the vibrations to the controller 17. In that case, the analog signal (i.e., the voltage value) output from the camera shake detector 30 is preferably A/D converted into a digital signal and then input to the controller 17. As used herein, the magnitudes of vibrations correspond to the amplitude of the image capture device 1 vibrating. For that reason, the magnitude of each voltage value is defined so as to correspond to the magnitude of its associated vibration.

Through a card slot 18, a storage medium such as a memory card 19 is inserted into, and removed from, the image capture device 1. Optionally, the card slot 18 may have a function for controlling the memory card 19. The memory card 19 may have a built-in flash memory, for example, and stores the image data that has been subjected to image processing by the image processing section 14.

The image capture device 1 further includes a touch screen panel 20, which is implemented as a combination of an LCD monitor and a matrix switch. The LCD monitor is a display section for presenting the image data and displaying various settings of the image capture device 1. Although an LCD monitor is used as the display section of this preferred embodiment, an organic EL display or any other suitable display may be used instead. Also, the matrix switch is a touch screen sensor for outputting, in response to the touch of a user's finger on the image presented on the display section, information about the location at which the user has touched the screen (i.e., a contact point signal) to the controller 17. Optionally, instead of such a matrix switch, the touch screen sensor may also use a resistive film or may even be a surface acoustic wave device that uses a glass plate with a piezoelectric element. The image capture device 1 of this preferred embodiment includes the touch screen panel 20. However, the present invention is in no way limited to this specific preferred embodiment. Alternatively, the display section may also be simply an LCD monitor with no touch screen sensors. In that case, the user enters various commands into this digital camera by tapping on an operating section 21.

As used herein, the "operating section 21" is a generic term for various operating members that are arranged on the surface of the housing of the image capture device 1. The operating section 21 includes cross keys and push buttons.

In this preferred embodiment, examples of the push buttons of the operating section include a shutter release button 211 (see FIG. 1), which is arranged on the upper surface of the image capture device 1 so as to sense the user press the button down either halfway or fully. When the user presses the button down either halfway or fully, the shutter release button 211 outputs an operating signal, representing that operation, to the controller 17.

Furthermore, in this preferred embodiment, a zoom ring 212 is provided as another member belonging to the operating section 21. On being turned by the user, the zoom ring 212 changes the zoom powers of the optical system 11 and outputs an operating signal to the controller 17. As a result, the controller 17 can send a control signal, instructing that the zoom powers be changed, to the zoom lens 112. That is to say, according to the present invention, the zoom power changing section may be implemented as the zoom ring 212. However, as long as it can change the zoom powers of the optical system, the zoom power changing section may also have any other configuration. For example, if the image capture device has an interchangeable lens, the zoom power changing section may be a zoom ring provided for the interchangeable lens. Alternatively, the zoom powers may also be changed by allowing the user to enter his or her desired zoom power by touching the touch screen panel 20.

1-2. Control Operations Performed by Controller 17

The controller 17 of this preferred embodiment performs face detection processing, tracking area setting processing, processing for controlling the electronic zooming by the image processing section 14, tracking area shifting processing, focus finding processing, and associating processing. That is to say, in this preferred embodiment, the controller 17 functions as a first area shifting section, a setting section, a section for controlling the electronic zoom processing section, a second area shifting section, a focus finding section and an associating section. In this preferred embodiment, the functions of all of these processing sections are performed by the controller 17. However, the present invention is in no way limited to such a specific preferred embodiment. Alternatively, at least some of those processing sections may be provided as circuits that work independently of the controller 17.

To perform the function of the first area shifting section, the controller 17 searches the image data, which has been generated by the CCD image sensor 12, for feature information that represents the feature of a face (which will be referred to herein as "face feature information"). And based on a result of the search for the face feature information and with respect to the location of the tracking area on the image data, the controller 17 shifts the face area sequentially. As used herein, the "face area" means a portion of the image data that has been determined to be an area with a face. In this preferred embodiment, the face feature area is an example of the first kind of feature information representing a local feature of the image data and the face area is an example of the first area.

To perform the function of the setting section, the controller 17 defines a portion of the image data, which has been generated by the CCD image sensor 12, as a tracking area 50 (see FIG. 4).

To control the electronic zooming, the controller 17 controls the image processing section 14. Under the control by the controller 17, the image processing section 14 electronically zooms in on, or out of, the image data that has been generated by the CCD image sensor 12, thereby generating zoomed-in or zoomed-out image data. If the zoom powers of the optical system 11 have been changed with the zoom ring 212 after the tracking area 50 has been defined, then the controller 17 instructs the image processing section 14 to generate image data that has been either zoomed in on, or out, by the same factor as the variation from the zoom power when the tracking area 50 was defined.

When functioning as the second area shifting section, the controller 17 searches the tracking area 50 for feature information representing a color feature (which will be referred to herein as "color feature information"). And based on a result of the search for the color feature information in the tracking area 50, the controller 17 shifts the tracking area sequentially. That is to say, in this preferred embodiment, the color feature information in the tracking area 50 is an example of the second kind of feature information representing a local feature of the image data and the tracking area 50 is an example of the second area.

The controller 17 performs the function of the focus finding section by controlling the optical system 11 such that the subject's image being captured by the CCD image sensor 12 can keep being in focus based on the image data in the tracking area 50 within the image represented by the image data that has been generated by the CCD image sensor 12.

And to perform the function of the associating section, the controller 17 associates the first and second areas with each other when finding those areas mutually associated. In this preferred embodiment, when finding the face area and the tracking area associated with each other, the controller 17 stores information about the relative locations of the tracking area and the face area as a location relation in the buffer memory 15.

Hereinafter, these various sorts of processing will be described in further detail.

1-2-1. Face Detection Processing

First, the face detection processing will be described. The face detection processing is carried out by getting the controller 17 to extract a feature from the image data (as the digital signal), compare the feature to pieces of feature information representing face areas that have been prepared in advance, and detecting one of those pieces of feature information that has the highest degree of similarity. In this manner, the controller 17 can shift the face area on the image data. The face areas may be detected by searching the image for areas, of which the luminances have high degrees of correlation with the template of a face area that has been defined in advance. Alternatively, the face areas may also be detected by performing skin color area detecting processing that detects portions of an image, of which the hues in an HSV color space are close enough to the predetermined hue of a skin color. Still alternatively, the face areas may also be detected by modeling human faces as ellipses and by detecting those ellipses by the Huagh transformation. Or the face areas may also be detected by detecting an area that is closely correlated to a face feature space that has been learned in advance by a statistical pattern recognition technique.

Also, in performing the face detection processing, sometimes the colors should be distinguished from each other. In that case, the digital signals should be generated based on optical signals representing the light that has been received by an optical sensor that uses R, G and B color filters. That is why when the face detection processing is carried out using the colors, the CCD image sensor 12 needs to be such an optical sensor that uses color filters.

In this preferred embodiment, the face detection processing is supposed to be carried out to detect face areas, of which the degrees of similarity are higher than a predetermined value. That is why depending on the image data acquired, no face areas could be detected at all.

Hereinafter, it will be described what if a number of face areas have been detected on the image data. If multiple face areas have been detected, then the image capture device of this preferred embodiment is designed to distinguish a primary subject from the other subjects according to the sizes and locations of those face areas. Alternatively, the primary subject does not have to be distinguished from the other subjects according to the sizes and locations of the face areas but may also be distinguished from each other based on the contrast ratios of the image data within the face areas. In that case, by detecting the contrast ratios of the image data within the face areas, one of the subjects that can be focused at the position closest to the current lens position can be defined as the primary subject. As a result, it is possible to prevent the subject that has once been defined as the primary one from decreasing the amount of information representing its identity as the primary subject with respect to the other subjects. This is based on the prediction that the subject that has been defined as the primary one would not make such a significant move from the previous piece of the image data to the next piece thereof.

In this preferred embodiment, if multiple faces have been detected on the image data as a result of the face detection processing, one of those face areas that has been defined as the primary subject is used to associate the face area with a tracking area and estimate the location of the tracking area.

1-2-2. Tracking Area Setting Processing

Figure 3:
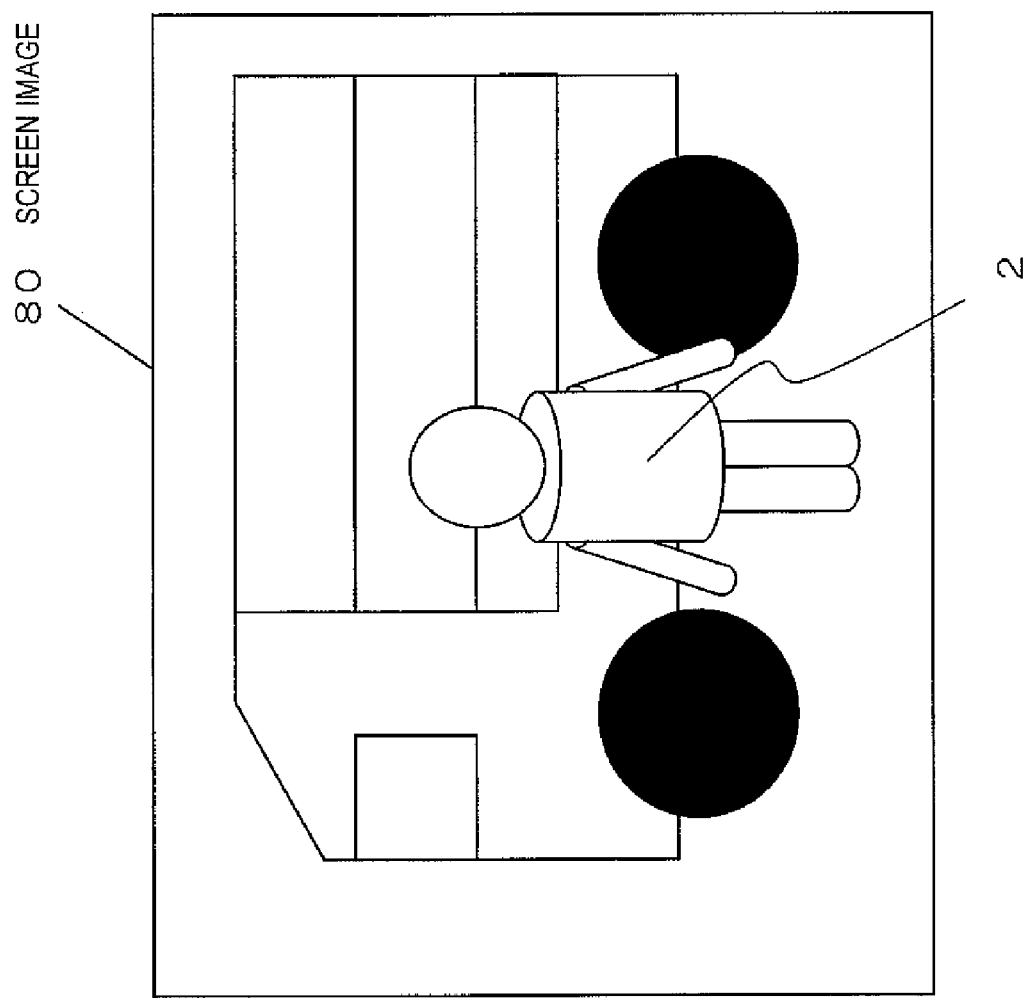
FIG. 3 illustrates an example of an image presented on the monitor screen of the image capture device 1 of the present invention.

The controller 17 gets the image data, which has been supplied from the image processing section 14, presented as a screen image 80 (see FIG. 3) on the LCD monitor. Also, if the user has touched the screen image 80 at a point of contact, the controller 17 defines a tracking area 50 on a portion of the subject's image 2, corresponding to the point of contact within the image data. In this case, if the screen image 80 has been touched at a point of contact, the matrix switch outputs the coordinates representing the point of contact to the controller 17. In response, the controller 17 defines the tracking area 50 on a portion of the subject's image 2 as specified by the coordinates within the image data. Then, the controller 17 gets the image data, on which the tracking area has been defined in this manner, presented as another screen image 81 on the LCD monitor as shown in FIG. 4.

1-2-3. Electronic Zooming Control Processing

If the zoom powers have been changed to the "TELE (i.e., zoom in)" side and if the CCD image sensor has obtained the image data such as the one shown in portion (a) of FIG. 5, the controller 17 performs the following processing. Specifically, the controller 17 instructs the image processing section 14 to electronically zoom out of the image data shown in portion (a) of FIG. 5 by the same factor as the variation from the zoom power when this tracking area 50 was defined. The zoomed-out image data may be the one shown in portion (b) of FIG. 5 for example.

In this case, if the zoom power when the tracking area 50 was defined was 2× (e.g., if the optical system 11 had its focal length defined at 50 mm) and if the zoom powers have been changed into 4× (e.g., if the optical system 11 has its focal length now defined at 100 mm), then the zoom power has been doubled compared to the zoom power when the tracking area 50 was defined. That is why the image data shown in portion (a) of FIG. 5 is zoomed out electronically as shown in portion (b) of FIG. 5 so that after the zoom powers have been changed, the angle of view will be decreased by the same factor as the increase in zoom power. Specifically, in this example, as the zoom power has been increased by a factor of 2, the angle of view is decreased by the same factor of 2. As a result, the image processing section 14 can generate image data that has been zoomed out by the same factor as the variation from the zoom power when the tracking area 50 was defined. It should be noted that a similar method is applicable to zooming in on the image data by the same factor as the variation from the zoom power when the tracking area 50 was defined.

1-2-4. Tracking Area Shifting Processing

The controller 17 performs a tracking operation on the subject, for which the tracking area 50 has been defined on the image data. To get this tracking operation done, the controller 17 performs the processing steps of storing color information, getting image data from a search area, searching for the color information, determining whether or not to shift the tracking area, and shifting the tracking area. Hereinafter, these processing steps will be described in detail one by one.

First, the color information storing processing step is the processing step of storing the color information of the image data within the tracking area 50 in a storage medium. Examples of preferred storage media include the buffer memory 15, the flash memory 16, and the memory card 19. But any other appropriate storage medium could also be used. To get the color information storing processing step done, the controller 17 extracts the image data from inside of the tracking area 50 as shown in portion (a) of FIG. 6 and then gets the color information of the image data within the tracking area 50. In this case, the color information is represented as the color space of the color phases. That is to say, the color phases can be represented by phase angles of 0 through 360 degrees. For example, if the color space is an HSV color space, the color phases of R, G and B can be represented by the angles of 0, 120 and 240 degrees, respectively, as shown in FIG. 7. For instance, if a given color is located as shown in FIG. 7, then that given color has a phase angle of θ degrees. As a result, the image data within the tracking area 50 shown in portion (a) of FIG. 6 may be represented by the histogram shown in portion (b) of FIG. 6, of which the abscissa represents the angle (degrees) and the ordinate represents the number of pixels of the respective color phases that are present within the tracking area. As for the abscissas, the minimum value (Min) thereof is 0 degrees while the maximum value (Max) thereof is 359 degrees. The controller 17 stores the color information thus obtained about the tracking area 50 in a storage medium such as the buffer memory 15, the flash memory 16 or the memory card 19. Preferably, the controller 17 stores the color information of the tracking area in a storage medium that is built in the image capture device 1. Then, the color information of the tracking area can be read in a short time. Alternatively, the color phases may also be represented by color locations on the spectrum. In that case, the wavelengths of light may be represented within the range of 300 nm through 780 nm.

The search area data getting processing step is the processing step of defining a search area 60, including the tracking area 50 and its surrounding area as shown in FIG. 8, and getting image data from the search area 60. That is to say, the controller 17 gets the image data from the search area 60, which may be nine (i.e., three (vertically) by three (horizontally)) times as large as the tracking area 50. It should be noted that if the zoom powers of the optical system 11 have been changed with the zoom ring 212 after the controller 17 defined the tracking area 50, then the search area 60, including the image data in the tracking area 50 and its surrounding area, is defined on the image data that has been zoomed in on or out by the image processing section 14 (e.g., the image data shown in portion (a) of FIG. 9). Then, the image data is gotten from the search area 60 as shown in portion (b) of FIG. 9. As a result, even if the zoom powers of the optical system 11 have been changed with the zoom ring 212 after the tracking area 50 was defined, the number of pixels within the search area may be approximately equal to that of pixels within the original search area when the tracking area was defined. Also, even if the zoom powers of the optical system 11 have been changed to the TELE side (i.e., increased) with the zoom ring 212 after the tracking area 50 was defined, it is possible to prevent the number of pixels within the search area from increasing so much as to increase the complexity of the search processing significantly.

The color information searching processing step is the processing step of searching the search area 60 for an area 70 that has the same shape and size as the tracking area 50 and that stores color information that is closest to that of the tracking area 50 that is stored in the storage medium (see FIG. 12A). For that purpose, the controller 17 reads the color information of the tracking area 50 from the storage medium and then searches the search area 60 for such an area 70, of which the color information is closest to the tracking area's that has been read out.

In this case, such an area 70 that has the closest color information can be searched for by using the areas to search (decision areas) in the following manner.

First of all, the controller 17 gets the image data from a decision area 10a that is located at the upper left corner of the search area 60 as shown in FIG. 10. Then, the controller 17 analyzes the color information of the image data gotten. In this case, the decision area 10a has the same shape and size as the tracking area 50. After having analyzed the color information of the image data in the decision area 10a, the controller 17 stores the color information in the decision area 10a as that of the currently most similar area in a storage medium.

Next, the controller 17 shifts the decision area to the right by one pixel to get color information from the shifted decision area 10b. Then, the controller 17 compares the color information in the decision area 10b to that of the currently most similar area that is stored (i.e., the color information in the decision area 10a), thereby determining which of these two decision areas 10a and 10b has the closer color information to that of the tracking area 50.

It the color information in the decision area 10b has been determined to be closer to the one in the tracking area 50, the controller 17 stores the color information in the decision area 10b in the storage medium. On the other hand, if the color information in the currently most similar area that is stored (i.e., the color information in the decision area 10a) is determined to be closer to the one in the tracking area 50, then the controller 17 shifts the decision area to the right again by one more pixel to make a decision on the next area. By performing this series of processing steps a number of times, the controller 17 search the search area 60. It should be noted that if the decision area reaches the upper right corner of the search area 60, then the controller 17 shifts the decision area down by one pixel and resumes the search from the end on the left hand side all over again.

By performing this series of processing steps a number of times, the controller 17 can search the search area 60 entirely. As a result, the controller 17 can search for an area, of which the color information is closest to the one in the tracking area 50. That is to say, the decision area, of which the color information will be stored in the storage medium when the search operation ends, becomes the most similar area 70. In this manner, the controller 17 can find the most similar area 70.

Next, it will be described exactly how the controller 17 determines which of the two decision areas has the closer color information to the one in the tracking area 50 by comparing the currently closest color information stored (e.g., the color information in the decision area 10a) to the one in the decision area 10b. The decision can be made by calculating the degrees of similarity of two curves that have been extracted based on the histogram of the color information. That is to say, the decision can be made by measuring a Euclidean distance (i.e., the degree of similarity) between a given curve and another curve. It should be noted that the Euclidean distance d (f, g) is a measure of distance and can be calculated with respect to vector quantities f and g by the following Equation (1):

$$d(f, g) = \sqrt{\sum_{i=0}^{k} (f(i) - g(i))^2} \quad (1)$$

Thus, the controller 17 compares the Euclidean distance between the color information in the tracking area 50 and the one in the decision area 10a to the Euclidean distance between the color information in the tracking area 50 and the one in the decision area 10b, thereby determining the color information with the smaller Euclidean distance to be the currently closest color information.

In the preferred embodiment described above, the color information in the decision area that has been determined to be the currently most similar area is supposed to be stored in the storage medium. However, the present invention is in no way limited to that specific preferred embodiment. For example, the degrees of similarities such as the Euclidean distances may be stored in the storage medium. Then, there is no need to calculate the Euclidean distance between the color information that is the currently closest one stored and the one in the tracking area.

Also, when the color information in a decision area is stored as that of the currently most similar area, the location information of that decision area is preferably stored as that of the currently most similar area in the storage medium. Then, just by reading the information from the storage medium when the controller 17 finishes searching the search area, the location information of the most similar area can be obtained. In this case, the location information of the decision area to be stored as that of the most similar area may be the location information 70a at the upper left corner of the decision area shown in FIG. 12A. The location information 70a may be stored in the form shown in FIG. 12B, for example. As a result, when the search ends, the location of the currently most similar area, of which the information is now stored, becomes the destination to which the tracking area 50 should be shifted. That is to say, the currently most similar area shown in FIG. 12B turns out to be the most similar area in the search area.

The shifting decision processing step is the processing step of determining whether the tracking area 50 should be shifted or not. In this preferred embodiment, the decision is made by determining whether or not the Euclidean distance between the color information in the most similar area 70 in the search area and the one stored in the storage medium is less than a predetermined value. If the Euclidean distance is less than the predetermined value, the controller 17 determines that the tracking area 50 be shifted. On the other hand, if the Euclidean distance is equal to or greater than the predetermined value, then the controller 17 determines that the tracking area not be shifted. It should be noted that the predetermined value is not particularly limited. That is to say, the shifting decision processing step may be any type of processing step as long as it can be determined whether the tracking area 50 should be shifted or not. In that case, if the color information searching processing step produced a search result with low accuracy, then shift of the tracking area 50 could be canceled. As a result, the image capture device I can carry out the tracking operation with high accuracy overall.

In the tracking area shifting processing step, the tracking area 50 is shifted to the most similar area 70, which has been found as a result of the search in the color information searching processing step, on the image data. Alternatively, the tracking area 50 may also be shifted with respect to the location where the face area has been detected on the image data and the relative locations of the tracking area and the face area as stored in the buffer memory 15. Specifically, if it has been determined, as a result of the shifting decision processing step, that the tracking area be shifted, the controller 17 shifts the tracking area 50 with respect to the location information of the most similar area 70 (as in the screen image 82 shown in FIG. 13). On the other hand, if it has been determined, as a result of the shifting decision processing step, that the tracking area not be shifted and if their relative locations are stored in the buffer memory 15, then the controller 17 shifts the tracking area with respect to the location where the face area has been detected on the image data and the relative locations of the tracking and face areas. It will be described in detail later exactly how to define the relative locations of the tracking area and the face area.

Hereinafter, it will be described exactly how to shift the tracking area with respect to the location where the face area has been detected and in accordance with the relation between the locations of the tracking and face areas. Suppose a face area 90 has been detected on given image data as a result of face detection processing as shown in FIG. 20 and it has been determined that the tracking area 50 not be shifted. In that case, first, the controller 17 puts a center point 3c on the face area 90. Next, in accordance with the relation between the locations of the tracking area and the face area g(as indicated by the arrow 23a in FIG. 21), the controller 17 defines the center point 2c of the tracking area 50 with respect to the center point 3c of the face area 90. Thereafter, the controller 17 estimates the current tracking area 50 with respect to the center point 2c of the tracking area 50. As a result, even if it has been determined, due to the failure to locate the most similar area 70 in the shifting decision processing step, for example, that the tracking area 50 not be shifted, the destination of the tracking area 50 can still be estimated and the tracking area 50 can eventually be shifted to that destination. It should be noted that the relation between the locations of the tracking area and the face area for use in this method is preferably adjusted according to the size of the face area.

The tracking area shifting processing can get done by performing these processing steps but will be described in further detail later.

1-2-5. Focus Finding Processing

To adjust the degree of focusing of the subject's image, being captured with the CCD image sensor 12, within the tracking area, the controller 17 controls the optical system 11. To control the focus finding operation, the controller 17 of this preferred embodiment performs the following processing steps. In the following example, the controller 17 adjusts the degree of focusing by some autofocus member of a mountain climbing type (i.e., contrasting type).

The controller 17 moves the focus lens 113 within a predetermined movable range of the focus lens 113, thereby getting image data from the image processing section 14 continuously. Then, the controller 17 analyzes the image data, being supplied continuously from the image processing section 14, within the tracking area. In this case, the controller 17 calculates the sharpness, which is a factor representing the degrees of definition of the image boundaries and the rendering performance of fine parts of the image. Next, the controller 17 selects a picture with the highest degree of sharpness from a number of pictures that have been supplied continuously. Subsequently, the controller 17 detects a position of the focus lens 113 where the selected picture can be obtained and determines, with respect to the current position of the focus lens 113, how much the focus lens 113 should be moved. Once the distance to go for the focus lens 113 has been determined, the controller 17 outputs a signal instructing the distance to the focus lens driving section 116 to move the focus lens 113. The current position of the focus lens 113 may be detected by any method. However, it is preferred that a position sensor be provided for the focus lens 113 to detect the current position of the focus lens 113 in the optical system 11 and that information about that current position be conveyed to the controller 17.

In this case, to control the optical system 11 such that the in-focus state is maintained continuously, the controller 17 continues to adjust the degree of focusing while performing the tracking control on the image data being captured by the CCD image sensor 12. Such a continuous adjustment of the degree of focusing is generally called "continuance AF" in the field of digital cameras. To get the continuance AF done by the AF technique of the contrast type, the technique disclosed in Japanese Patent Application Laid-Open Publication No. 2003-140035 may be used, for example. More specifically, the continuance AF can get done by the main AF processing disclosed in Paragraphs #0012 through #0016 of Japanese Patent Application Laid-Open Publication No. 2003-140035.

By performing these processing steps, the image capture device 1 can continuously maintain the in-focus state with respect to the subject.

1-2-6 Associating Processing

The associating processing is the processing of associating the tracking area 50 with the face area 90 in a situation where the sequential shifts of the tracking area 50 by the tracking area shifting processing turned out to be associated with the sequential moves of the face area 90 by the face detection processing.

Hereinafter, a specific associating method will be described. Suppose a face area 90 including a face 3 has been detected on the image data shown in FIG. 16 and a tracking area 50 has been defined on the image data. In that case, the controller 17 gets the relative location data 23 of the center point 3c of the face area 90 and the center point 2c of the tracking area 50 as indicated by the arrow (e.g., X and Y coordinates that are defined with respect to the center point 3c of the face area 90). Then, the controller 17 stores the relative location data 23 thus obtained in the buffer memory 15.

Next, suppose another face area 90 has been detected by the face detection processing in the next frame of the image data being captured by the CCD image sensor 12 while the tracking area 50 is being shifted by performing the tracking area shifting processing as shown in portion (a) of FIG. 17. In that case, the controller 17 defines an association area 100 on the image data with respect to the center point 3c of the face area 90 detected and based on the relative location data 23 stored in the buffer memory 15. Then, the controller 17 determines whether or not the tracking area 50 is located inside of the association area 100. In this case, the association area 100 has a bigger size than the tracking area 50. And the association area 100 is arranged such that its center point agrees with a set point 2s to be defined by the center point 3c of the face area 90 and the relative location data 23 stored. It should be noted that the size and the method of defining the association area are not limited to the ones described above.

This processing step of determining whether or not the tracking area 50 that has been shifted by performing the tracking area shifting processing is located inside of the association area 100 is performed on multiple pictures (e.g., 10 frames) of the image data. Portion (b) of FIG. 17 illustrates a situation where the tracking area 50 is located fully inside of the association area 100. On the other hand, portion (c) of FIG. 17 illustrates a situation where the tracking area 50 is not fully located inside of the association area 100. If the tracking area 50 has turned out to be fully located inside of the association area 100 in at least a predetermined number of pictures (e.g., 8 frames or more) of the image data after multiple pictures (e.g., 10 frames) of the image data have been received, then the tracking area 50 gets associated with the face area 90. This association means storing their relative location data in the buffer memory 15 as statistically defined location data of the tracking area 50 and the face area 90. That is to say, the image capture device 1 regards the relative location data as information with a low degree of reliability and the statistically defined location data (that has been collected from the multiple pictures of the image data) as information with a high degree of reliability.

In this preferred embodiment, the statistically defined location data stored in the buffer memory 15 is supposed to be used. However, the present invention is in no way limited to that specific preferred embodiment. Alternatively, the relative locations and/or the association area may be adjusted according to the size of the face area. For example, if the face area has been zoomed in on, the distance between the center points and the size of the association area may be increased as shown in portions (a) and (b) of FIG. 18. On the other hand, if the face area has been zoomed out, the distance between the center points and the size of the association area may be decreased as shown in portions (a) and (c) of FIG. 18. In this manner, the relative locations and the association area can be adjusted according to the size of the given face area. That is why the association can get done adaptively to the size of the subject in the image data. As a result, the association processing can be carried out more accurately.

Also, in the preferred embodiment described above, the location data is supposed to be stored in the buffer memory 15. However, the present invention is in no way limited to that specific preferred embodiment. Alternatively, the location data may also be stored in a storage medium such as a flash memory or a memory card.

The association processing will be described in further detail later.

2. Operation

2-1. Tracking Operation

Hereinafter, it will be described with reference to the flowcharts shown in FIGS. 14 and 15 exactly how this image capture device 1 works. If the power switch (not shown) in OFF state is turned ON and a tracking shooting mode is selected, the image capture device 1 performs the following operation.

Now take a look at FIG. 14. First of all, the CCD image sensor 12 captures a subject's image and generates image data in Step S1. The image data thus generated is supplied to the controller 17 by way of the A/D converter 13 and the image processing section 14. In this case, the image data is acquired repeatedly by the CCD image sensor 12 until the next processing step S2 is performed.

In response, the controller 17 gets the image data presented as the screen image 80 (see FIG. 3) on the touch screen panel 20. Then, the controller 17 allows the user to enter his or her command by touching the touch screen panel 20. On accepting the user's command, the controller 17 sets a tracking area 50 on the image data based on the point of contact on the touch screen panel 20 in Step S2. In this processing step, the controller 17 presents such image data, on which the tracking area 50 has been defined, as the screen image 81 (see FIG. 4) on the touch screen panel 20.

Next, the controller 17 gets the image data from inside of the tracking area 50, and then stores color information, obtained by analyzing the image data in the tracking area 50, in a storage medium in Step S3. Subsequently, the controller 17 adjusts the degree of focusing of the subject's image 2 on which the tracking area 50 has been defined in Step S4. And then the controller 17 performs the tracking processing in Step S5. Although not shown, the controller 17 also performs the focusing control (i.e., the continuance AF) in parallel with the tracking processing.

Hereinafter, the tracking operation will be described with reference to the flowchart shown in FIG. 15. First of all, the CCD image sensor 12 captures the subject's image and generates image data (in Step T1). The image data thus obtained is supplied to the controller 17 by way of the A/D converter 13 and the image processing section 14.

Next, after setting the tracking area 50, the controller 17 determines whether or not the zoom powers of the optical system 11 have been changed with the zoom ring 212 (in Step T2).

If the answer is YES, the controller 17 controls the image processing section 14. Under the control by the controller 17, the image processing section 14 generates image data that has been either zoomed in on or out by the same factor as the variation from the original zoom power when that tracking area 50 was defined (in Step T3). On the other hand, if the answer is NO, then the process jumps to Step T4.

Subsequently, the controller 17 defines the search area 60 (see FIG. 8) in the zoomed-in/out image data or the non-zoomed-in/out image data, and then gets the image data from inside of the search area 60 (in Step T4). Thereafter, the controller 17 searches the image data thus obtained from the search area 60 for the area 70 (see FIG. 12A), of which the color information is closest to that of the tracking area 50 (in Step T5).

Next, the controller 17 performs the area shifting processing of shifting the tracking area shown in FIG. 19 (in Step T6). And then the process goes back to the processing step T1 again to newly get another (frame of the) image data from the CCD image sensor 12.

Hereinafter, the area shifting processing shown in FIG. 19 will be described. First of all, based on a result of the search that has been performed in Step T5, the controller 17 determines whether or not the tracking area 50 should be shifted (in Step U1). If the answer is YES, the controller 17 shifts the tracking area 50 to the most similar area (in Step U2). In that case, the controller 17 gets the image data, on which the tracking area 50 has been shifted, presented as a screen image 82 (see FIG. 13) on the touch screen panel 20. Then, the process advances to Step U6.

On the other hand, if the answer to the query of Step U1 is NO, then the controller 17 determines whether or not a face area has been detected on the image data and whether or not the tracking area and the face area are associated with each other (in Step U3).

If the answer is YES (i.e., if the face area has been detected and if the statistically defined location data is stored in the buffer memory (if the tracking area and the face area are associated with each other)), then the controller 17 shifts the tracking area 50 as shown in FIG. 21 with respect to the location of the face area 90 on the image data and based on their location data stored in the buffer memory 15 (in Step U4). In this processing step, the controller 17 gets the image data, on which the tracking area 50 has been shifted, presented on the touch screen panel 20 (see FIG. 21). Then, the process advances to Step U6.

If a number of face areas (or subjects) have been detected on the given image data, then the location of the tracking area may be estimated based on that of the face area of a primary one of the subjects in the processing step U4. Alternatively, instead of using the face area of the primary subject, the location of the tracking area could also be estimated based on that of the face area that is closest to the one that has been detected in the previous picture of the image data.

If no face areas have been detected or if no statistically defined location data is stored in the buffer memory 15, then the controller 17 performs a control in such a manner as not to shift the tracking area 50 (in Step U5) That is to say, the controller 17 does nothing but ends the tracking area shifting processing.

If the processing step U6 is performed after the processing step U2, the controller 17 analyzes the image data in the most similar area 70 and stores the color information analyzed in a storage medium. On the other hand, if the processing step U6 is performed after the processing step U4, then the controller 17 analyzes the image data in the tracking area 50 shifted and stores the color information analyzed in the storage medium.

And when this processing step U6 gets done, the area shifting processing ends.

In this manner, the image capture device 1 performs the tracking area shifting processing on the target subject.

2-2 Association Operation

Hereinafter, it will be described with reference to the flowchart shown in FIG. 22 how to associate the face area 90 and the tracking area 50 with each other. When the face detection processing and the tracking processing are started, the following processing is started. In the operation to be described below, if a number of face areas (of multiple subjects) have been detected on the given image data, only the face area of a primary one of the subjects is used to associate that face area with the tracking area.

First of all, the controller 17 gets the image data that has been generated by the CCD image sensor 12 (in Step V1). Next, the controller 17 determines whether or not any face area 90 has been detected on the image data gotten and whether or not the tracking area 50 has been defined on the image data (in Step V2). As used herein, if "the tracking area 50 has been defined", then it is the user that has specified the tracking area 50 as shown in FIG. 4.

If any face area 90 has been detected and if the tracking area 50 has been defined in the processing step V2, then the controller 17 sets both an association number and a frame number, which are pieces of information that can be used to make a decision on the association, to be zero (in Step V3) On the other hand, if no face areas 90 have been detected at all or if the tracking area 50 has not been defined, then the controller 17 performs the processing step VI all over again.

When the processing step V3 gets done, the controller 17 extracts the relative location data of the face area 90 and the tracking area 50 (in Step V4). In this processing step, the controller 17 stores the relative location data in the buffer memory 15.

Then, the controller 17 newly gets another (frame of the) image data that has been generated by the CCD image sensor 12 (in Step V5). And the controller 17 performs the face detection processing and the tracking area shifting processing on this newly acquired frame of the image data. Then, the controller 17 determines whether or not the face area 90 has been detected and whether or not the tracking area 50, which has been determined to be shifted as a result of the shifting decision processing, has actually been shifted (in Step V6).

If the answer to the query of Step V6 is YES, the controller 17 performs the processing step V7. On the other hand, if the answer is NO (i.e., if no face areas 90 have been detected or if the tracking area 50 has not been shifted) then the process goes back to the processing step V1 so that the controller 17 performs the same series of processing steps all over again.

In the processing step V7, the controller 17 determines whether or not the tracking area 50 shifted is located fully inside of the association area 100 that has been defined with respect to the location of the face area 90. If the answer is YES, the controller 17 increments both the association number and the frame number by one (in Step V8). On the other hand, if the answer is NO, then the controller 17 increments just the frame number by one (in Step V9).

Next, when the processing steps V8 and V9 get done, the controller 17 determines whether or not the frame number is equal to or greater than 10 (in Step V10). If the answer is YES, the process advances to Step V11. On the other hand, if the answer is NO, then the process goes back to the processing step V5.

In the processing step V11, the controller 17 determines whether or not the association number is equal to or greater than eight. If the answer is YES, the controller 17 determines that the face area 90 and the tracking area 50 are associated with each other and stores their relative location data as statistically defined location data in the buffer memory 15 (in Step V12). On the other hand, if the answer is NO (i.e., the association number is less than eight), then the controller 17 stores no location data but ends the association processing.

In this manner, the face area 90 and the tracking area 50 can get associated with each other. In the preferred embodiment described above, the relative location data of the tracking area 50 and the face area 90 is supposed to be stored when the tracking area 50 should be defined. However, the present invention is in no way limited to that specific preferred embodiment. Alternatively, when it is determined in Step V11 that the tracking area 50 and the face area 90 cannot be associated with each other, the relative location data of the face area 90 that has been detected on the image data by that point in time and the tracking area 50 that has been defined by that point in time may be stored instead. In that case, the image capture device 1 performs this association processing a number of times until the tracking area 50 and the face area 90 can get associated with each other.

In the preferred embodiment described above, it is determined, with respect to the center point of the face area 90, whether or not the tracking area 50 can get associated with the face area 90. Such a method is adopted because the center point of the face area 90 can be located more easily than that of the tracking area 50. That is to say, the face area 90 has various sorts of feature information such as the face shape and the eyes locations, and therefore, its center point can be located relatively easily. On the other hand, the tracking area 50 uses color feature information (or histogram), and its center point is not so easy to locate as the face area 90.

As described above, the image capture device 1 of this preferred embodiment includes a CCD image sensor 12 that captures a subject's image and generates multiple pictures of image data sequentially as still pictures, thereby outputting a moving picture. The device 1 also includes a controller 17 that searches the Image data, generated by the CCD image sensor 12, for face feature information and that sequentially shifts the face area 90 based on a result of the search for the face feature information (i.e., a controller in charge of the face detection processing). And the device 1 further includes a controller 17 that searches the image data, generated by the CCD image sensor 12, for color feature information and that sequentially shifts the tracking area 50 based on a result of the search for the color feature information and/or the location of the face area 90 on the image data (i.e., a controller in charge of the tracking area shifting processing).

The image capture device 1 of this preferred embodiment performs the face detection processing and the tracking area shifting processing independently of each other, and shifts the tracking area 50 based on a result of the search for the color feature information in the tracking area shifting processing and/or the location of the face area 90 on the image data. Even if the destination of the tracking area 50 to be shifted cannot be determined by the color information, the tracking area 50 can still be shifted with respect to the location of the face area 90 that is moving independently of the tracking area 50. As a result, the tracking area 50 can be shifted more accurately.

Although the present invention has been described by way of illustrative preferred embodiments, the present invention is in no way limited to those specific preferred embodiments. Hereinafter, a modified example of the image capture device 1 of the present invention will be described.

In the preferred embodiments of the present invention described above, a CCD image sensor 12 is used as an exemplary image capturing section. However, any other imager may also be used instead of the CCD image sensor 12. Examples of other preferred imagers include a CMOS image sensor. By using a CMOS image sensor, the power dissipation can be cut down. In any case, any device that can capture a subject's image and generate image data may be used as the image capturing section.

Also, in the preferred embodiments of the present invention described above, the timing generator 121 is supposed to supply a pulse signal, instructing that data be read at a rate of 30 frames per second, to the CCD image sensor 12. However, the present invention is in no way limited to those specific preferred embodiments. Alternatively, 50 or 60 pulses may also be applied per second. In short, the timing generator 121 just needs to supply a pulse signal so that a predetermined number of frames can be read per second.

Furthermore, in the preferred embodiments of the present invention described above, a dual-axis camera shake detector 30, including two gyro sensors, is supposed to be used as the vibration sensing section. However, the present invention is in no way limited to that specific preferred embodiment. Alternatively, the vibration sensing section may also have any other configuration as long as it can sense the vibrations of the image capture device 1 itself. For example, the vibration sensing section may sense vibrations along only one axis. Also, the gyro sensors may be implemented as any of various types including oscillating, mechanical and optical sensors. Furthermore, although the magnitudes of the vibrations are supposed to be represented as amplitudes in the preferred embodiments described above, they may also be represented by any other values.

Furthermore, the foregoing description of preferred embodiments of the present invention relates to a device including the touch screen panel 20. However, the image capture device 1 of the present invention may include just a display section such as an LCD monitor and an input device such as cross keys and push buttons with no touch screen sensors.

Furthermore, in the preferred embodiments of the present invention described above, a controller 17 that performs autofocusing of the mountain climbing type is supposed to be used as the focus finding section. However, it is not always necessary to use such a controller but a controller that can adjust the degree of focusing by any other AF processing can also be used. For example, the phase difference detecting technique, which is generally used in single-lens reflex cameras, for example, may also be adopted.

Also, in the preferred embodiments of the present invention described above, a controller 17 that performs the continuance AF control is supposed to be used as the focus finding section. However, any other focus finding section may be used as long as it can adjust the degree of focusing at a predetermined timing. As used herein, the "predetermined timing" may be the moment when the user instructs the digital camera to perform shooting by pressing the shutter release button of the operating section fully. That is to say, the focus finding section may be implemented in any other form as long as it can adjust the degree of focusing.

Furthermore, in the preferred embodiments of the present invention described above, the user is supposed to set the tracking area on the image data by tapping on the touch screen panel. However, the present invention is in no way limited to those specific preferred embodiments. Alternatively, operating members such as cross keys may be provided for the digital camera so that the user can set the tracking area by tapping the cross keys, for example.

Also, in the preferred embodiments of the present invention described above, tracking is supposed to be done by reference to the color (or color phase) information. However, the tracking processing can also be carried out by reference to any other sort of information such as luminance signal information, shape, temperature, and some distinct contrast in the subject.

Furthermore, in the preferred embodiments of the present invention described above, the tracking operation is supposed to be carried out every frame of the image data obtained. However, the present invention is in no way limited to those specific preferred embodiments.

Furthermore, in the preferred embodiments of the present invention described above, it is not until the tracking area is shifted that another frame of the image data is newly obtained for the sake of simplicity of description. However, this is just an example. If necessary, the tracking operation (i.e., the processing steps T1 through T6 shown in FIG. 15) may be carried out in parallel. Such processing may be performed just like the pipeline processing for computers. Then, the processing can be done more quickly.

Furthermore, in the preferred embodiments of the present invention described above, a single controller is supposed to perform the functions of various processing sections. However, those functions may also be performed by two or more controllers.

Also, in the preferred embodiments of the present invention described above, the image data is supposed to be electronically zoomed out by the same factor as the variation from the zoom power when the tracking area 50 was defined, thereby generating zoomed-out image data. However, any other scheme may also be adopted as long as when the zoom powers are changed into the TELE side (i.e., increased), the image data can be electronically zoomed out so that zoomed-out image data can be generated. Likewise, any other scheme may also be adopted as long as when the zoom powers are changed into the WIDE side (i.e., decreased), the image data can be electronically zoomed in on so that zoomed-in image data can be generated.

Furthermore, in the preferred embodiments of the present invention described above, the degree of closeness between two pieces of color information is determined by the Euclidean distance between the two histograms. However, the present invention is in no way limited to those specific preferred embodiments. For example, the numbers of pixels in the two histograms may be subjected to the AND (logical multiplication) operation on a color phase basis and the degree of closeness may be determined by the number of remaining histograms (in short, how many pixels agree with each other in each color phase). In that case, one of the two areas with the greater number of remaining histograms will be the area with the higher degree of closeness. In that case, the processing of comparing the histograms can get done by performing the AND operation on the numbers of pixels mainly on a color phase basis. As a result, the histograms can be compared to each other by performing a simple operation.

Furthermore, in the preferred embodiments of the present invention described above, the relative location data is supposed to be defined with respect to the respective center points of the face area and the tracking area. However, this is just an example. Optionally, the relative location data 23b may also be defined with respect to respective upper left corners of the face area 90 and the tracking area 50 as shown in FIG. 23. In any case, the relative location data may be defined in any other way as long as the relation between the locations of the face area 90 and the tracking area 50 can be determined.

In the specific preferred embodiments of the present invention described above, face feature information is supposed to be used as a first kind of feature information and color feature information is supposed to be used as a second kind of feature information. However, this is only an example. If necessary, any other piece of information such as luminance signal information, shape, temperature or some distinct contrast in the subject may also be used as at least one of the first and second pieces of feature information.

Furthermore, in the preferred embodiments of the present invention described above, if a number of faces have been detected on the given image data as a result of the face detection processing, then one of those face areas that has been determined to be the primary subject is used to associate the face and tracking areas with each other and to estimate the location of the tracking area. However, the present invention is in no way limited to those specific preferred embodiments.

Also, if the face area, which is now being checked if it should be associated with the tracking area, is regarded as belonging to the primary subject, then the relative location data of the face and tracking areas may be stored when the settings of the primary subject are changed with respect to that face area, not when the tracking area setting operation is started. In that case, the face area of the primary subject and the tracking area can be associated with each other more easily.

Furthermore, in the preferred embodiments of the present invention described above, the user is supposed to be allowed to set the tracking area on the image data. However, this is just an example. Alternatively, the digital camera itself may estimate and set the location of the tracking area that would be associated with the face area. Even so, the face detection processing and the tracking area shifting processing need to be carried out independently of each other. In this manner, the tracking area and the face area can get associated with each other based on the relative locations of the tracking and face areas thus defined. As a result, the user no longer needs to set the tracking area by him- or herself.

Furthermore, in the preferred embodiments of the present invention described above, if the tracking area cannot be shifted in the shifting decision processing, then the destination of the tracking area to be shifted is supposed to be estimated with respect to the location of the face area on the image data and the relation between the locations of the face and tracking areas. However, this is only an example. Alternatively, if no face areas have been detected from a certain picture of the image data, the location of the face area may also be estimated with respect to the location of the tracking area on that picture of the image data and the relation between the locations of the face and tracking areas.

Hereinafter, the processing to perform in such a situation where no face areas have been detected will be described with reference to the flowchart shown in FIG. 24, which shows the procedure of face area defining processing.

First, the controller 17 gets the image data that has been generated by the CCD image sensor 12 and determines whether or not any face area 90 has been detected (in Step W1) If any face area 90 has been detected on the image data, then the controller 17 defines that face area 90 detected on the image data (in Step W2). In that case, the controller 17 gets the image data, on which the face area 90 has been defined, on the touch screen panel 20.

On the other hand, if the controller 17 cannot detect any face area 90 as shown in FIG. 25, then the controller 17 determines whether or not the tracking area 50 has been shifted following the decision of the shifting decision processing that the shifting area 50 be shifted and also determines whether or not the tracking area 50 and the face area 90 are associated with each other (in Step W3).

If it turned out that the tracking area 50 has been shifted and that the statistically defined location data is stored in the buffer memory 15 (i.e., the tracking area 50 and the face area 90 get associated with each other), then the controller 17 estimates and defines the location of the face area 90 as shown in FIG. 26 with respect to the location of the tracking area 50 on the image data and the location data stored in the buffer memory 15 (in Step W4). In that case, the controller 17 gets the image data, on which the face area 90 has been defined, presented on the touch screen panel 20.

On the other hand, if it turned out that the tracking area 50 has not been shifted yet or if no statistically defined location data is stored in the buffer memory 15, then the controller 17 performs a control such that no face areas 90 are defined (in Step W5). That is to say, the controller 17 does nothing but ends the face area defining processing.

According to such a procedure, even if no face areas have been detected on the image data, a face area can still be defined on the image data with its location estimated.

The image capture device 1 of the preferred embodiment described above performs the face detection processing and the tracking area shifting processing independently of each other, and estimates and defines the location of the face area 90 based on a result of the detection of the face area 90 and/or the location of the tracking area 50 on the image data. Even if the image capture device 1 has failed to detect any face area 90 directly, the device can still estimate and define the location of the face area 90 with respect to the location of the tracking area 50 being shifted independently of the face area 90.

Thus, if the image capture device 1 of this preferred embodiment can determine the location of one of the face and tracking areas 90 and 50, the device can also estimate the location of the other. Since the detection of the face area 90 and the shift of the tracking area 50 are done independently of each other, it is possible to avoid an unwanted situation where a poor detection accuracy of one of the two areas would cause a poor detection accuracy of the other area. As a result, the face area 90 and the tracking area 50 can be defined with sufficiently high accuracy.

It should be noted that if the location of the face area 90 is estimated based on that of the tracking area 50 as is done in the preferred embodiment shown in FIG. 24, it is preferred that the estimation be done in the following manner. Specifically, before the processing step W4 is performed, it is determined whether or not the size (i.e., the two-dimensional area) of the tracking area 50 is equal to or smaller than that of the face area 90. If the answer is YES, then the location of the face area 90 is preferably estimated based on that of the tracking area 50. In that way, the face area 90 can be estimated more accurately. The reason is as follows. If the tracking area 50 is bigger than the face area 90 as shown in FIG. 27A, then some sort of feature information such as the color of the subject's cloths should be tracked in the tracking area 50, and therefore, the relative locations of the respective center points of the tracking area 50 and the face area 90 would easily vary significantly. That is why if the location of the face area 90 were estimated based on that of such a tracking area 50, then the accuracy of estimation of the face area 90 should be low. For that reason, if the location of the face area 90 is estimated in a situation where the size (i.e., two-dimensional area) of the tracking area 50 is equal to or smaller than that of the face area 90 as shown in FIG. 27B, then the relative locations of their respective center points will not vary so easily, and the location of the face area 90 can be estimated highly accurately.

Furthermore, in the preferred embodiments of the present invention described above, the image capture device 1 is supposed to follow the procedure shown in FIG. 19. However, this is just an example. Specifically, if the controller 17 has determined, in the processing step U1 shown in FIG. 19, that the tracking area 50 not be shifted based on a result of the search in the processing step T5 (see FIG. 15) and if the answer to the query of Step U3 is YES, then the controller 17 estimates the location of the tracking area 50 with respect to the location of the face area 90 and the statistically defined location data of the face and tracking areas (in Step U4). However, the present invention is in no way limited to that specific preferred embodiment. Alternatively, the processing step U4 may be performed if the controller 17 has determined, in the processing step U1, that the tracking area 50 be shifted based on a result of the search in the processing step T5 and if predetermined conditions are satisfied in Step X1 as shown in FIG. 28. In this case, the "predetermined conditions" may be that the tracking area 50 and the face area 90 are associated with each other and that the tracking area 50 to be shifted is not located fully inside of the association area 100 to be defined based on the location of the face area 90. That is to say, if the controller 17 has determined that the tracking area 50 and the face area 90 are associated with each other and that the tracking area 50 is not located fully inside of the association area 100 to be associated with the face area 90, then the process may advance to the processing step U4. According to such a procedure, even if the tracking area 50 can be tracked but if the tracking area 50 has been determined to be not located fully inside of the association area 100, then the location of the tracking area 50 can be estimated with respect to that of the face area 90. As a result, in an environment where the face area 90 can be detected accurately, the tracking operation can get done even more accurately.

Also, even when the location of the face area 90 is estimated with respect to that of the tracking area 50 as is done in FIG. 24, the processing can also be performed in the same way. The predetermined conditions for use in such a situation may also be defined as in the processing step X1. That is to say, in that case, if the tracking area 50 and the face area 90 are associated with each other and if one of the two areas is not located fully inside of the association area that has been defined based on the other area, the location of the one area is estimated with respect to that of the other area.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

The present invention is applicable to various image capture devices with a tracking function. Examples of those devices include digital cameras, camcorders and cellphones with camera that have the tracking function.

This application is based on Japanese Patent Applications No. 2008-091093 filed on Mar. 31, 2008 and No. 2009-083081 filed on Mar. 30, 2009, the entire contents of which are hereby incorporated by reference.

What is claimed is:

1. An image capture device comprising:
   an image capturing section for capturing a subject's image and generating image data, thereby outputting a moving picture;
   a first area shifting section for searching the image data for a first kind of feature information that represents a first feature and shifting a first area which is associated with the first kind of feature information based on a result of search for the first kind of feature information; and
   a second area shifting section for searching the image data for a second kind of feature information that represents a second feature and operable to shift, independently of the first area, a second area which is associated with the second kind of feature information based on a result of search for the second kind of feature information;
   wherein the second area shifting section is operable to shift the second area independently of the first area after associating the second area with the first area; and
   the second area shifting section selects, based on the result of search for the second kind of feature information, at least one of the results of search for the second kind of feature information and a location of the first area on the image data and shifts the second area based on the result of the selection.

2. The image capture device of claim 1, wherein in shifting the second area with respect to the location of the first area on the image data, the second area shifting section determines the destination of the second area in accordance with the relation between the locations of the first and second areas that has been defined statistically based on past image data.

3. The image capture device of claim 1, wherein the relation between the locations of the first and second areas has been defined statistically by determining the first and second areas to be associated with each other on multiple pictures of the past image data.

4. The image capture device of claim 1, wherein the first kind of feature information is a piece of information about the subject's face, and
   wherein the second kind of feature information is a piece of information about the color of a portion of the subject's image.

5. The image capture device of claim 1, wherein the first kind of feature information is a piece of information about the color of a portion of the subject's image, and
   wherein the second kind of feature information is a piece of information about the subject's face.

6. The image capture device of claim 1, wherein the second area shifting section is operable to shift the second area independently of the first area after storing, as location data, a relative location between the first area and the second area.

7. The image capture device of claim 1, wherein the second area shifting section is operable to shift the second area independently of the first area after determining that the first area and the second area correspond to the same subject.

8. The image capture device of claim 1, wherein if the destination of the second area to be shifted cannot be determined by using the second kind of feature, the second area shifting section shifts the second area by using a detected location of the first area.

* * * * *